(12) United States Patent
Oboril et al.

(10) Patent No.: US 12,420,422 B2
(45) Date of Patent: Sep. 23, 2025

(54) SITUATION-AWARE SAFETY ASSESSMENT OF ROBOT-HUMAN ACTIVITIES

(71) Applicant: Intel Corporation, Santa Clara, CA (US)

(72) Inventors: Fabian Oboril, Karlsruhe (DE); Cornelius Buerkle, Karlsruhe (DE); Frederik Pasch, Karlsruhe (DE); Bernd Gassmann, Straubenhardt (DE); Chien Chern Yew, Pulau Penang (MY); Tze Ming Hau, Negeri Sembilan (MY); Ying Wei Liew, Pulau Penang (MY); Say Chuan Tan, Penang (MY); Wei Seng Yeap, Penang (MY)

(73) Assignee: Intel Corporation, Santa Clara, CA (US)

( * ) Notice: Subject to any disclaimer, the term of this patent is extended or adjusted under 35 U.S.C. 154(b) by 768 days.

(21) Appl. No.: 17/553,854

(22) Filed: Dec. 17, 2021

(65) Prior Publication Data

US 2022/0105634 A1 Apr. 7, 2022

(51) Int. Cl.
*B25J 9/16* (2006.01)
*G09B 19/16* (2006.01)
*G09B 19/24* (2006.01)

(52) U.S. Cl.
CPC .............. *B25J 9/1676* (2013.01); *B25J 9/163* (2013.01); *B25J 9/1666* (2013.01); *G09B 19/16* (2013.01)

(58) Field of Classification Search
CPC ........ B25J 9/1676; B25J 9/163; B25J 9/1666; G09B 19/16; G09B 19/24; G05B 2219/40202
See application file for complete search history.

(56) References Cited

U.S. PATENT DOCUMENTS

| 2011/0231016 A1* | 9/2011 | Goulding | ............. | G05D 1/0088 |
| | | | | 901/1 |
| 2017/0190051 A1* | 7/2017 | O'Sullivan | .......... | G05D 1/0088 |

(Continued)

FOREIGN PATENT DOCUMENTS

| CN | 112883792 A | | 6/2021 |
| JP | 2020097091 A | * | 6/2020 |

OTHER PUBLICATIONS

M. Ghandour, H. Liu, N. Stoll and K. Thurow, "Interactive collision avoidance system for indoor mobile robots based on human-robot interaction," 2016 9th International Conference on Human System Interactions (HSI), Portsmouth, UK, 2016, pp. 209-215 (Year: 2016).*

(Continued)

*Primary Examiner* — Adam R Mott
*Assistant Examiner* — Heather J Keniry
(74) *Attorney, Agent, or Firm* — Viering, Jentschura & Partner mbB

(57) ABSTRACT

Disclosed herein are systems, devices, and methods of a safety system for analyzing and improving the safety of collaborative environments in which a robot may interact a human. The safety system may determine a monitored attribute of a person within an operating environment of a robot, where the monitored attribute may be based on received sensor information about the person in the operating environment. In addition, the safety system may determine a risk score for the person based on the monitored attribute. The risk score may be defined by (1) a collision probability that the person will cause an interference during a planned operation of the robot and (2) a severity level associated with the interference. The safety system may also generate a mitigating instruction for the robot if the risk score exceeds a threshold level.

18 Claims, 8 Drawing Sheets

(56) References Cited

U.S. PATENT DOCUMENTS

| | | | | |
|---|---|---|---|---|
| 2020/0202472 | A1* | 6/2020 | Barak | H04W 4/021 |
| 2020/0316782 | A1* | 10/2020 | Chavez | G06T 7/73 |
| 2021/0210202 | A1* | 7/2021 | Awiszus | G06F 18/214 |
| 2021/0307678 | A1* | 10/2021 | Yoshikawa | G06Q 10/0635 |

OTHER PUBLICATIONS

BBC; "Amazon warehouse robots 'increase staff injuries'"; https://www.bbc.com/news/technology-54355803; retrieved on Nov. 25, 2021; 16 pages.

Metrology and Quality News; "Making Safe Robotics More Productive"; https://metrology.news/making-safe-robotics-more-productive/; retrieved on Nov. 25, 2021; 7 pages.

Zhihao Liu et al., "Dynamic risk assessment and active respons strategy for industrial human-robot collaboration", Computers & Industrial Engineering, downloaded on Nov. 25, 2021, 59 pages, University of Birmingham, vol. 141.

Jan Reich et al., "Towards a Software Component to perform Situation-Aware Dynamic Risk Assessment for Autronomous Vehicles", Sep. 2021, 10 pages.

J. Eggert et al., "A foresighted driver model derived from integral expected risk", 2019 IEEE Intelligent Transportation Systems Conference (ITSC), Oct. 27-30, 2019, 8 pages, ITSC 2019 Conference Proceedings, Auckland, New Zealand.

European Search Report issued for the corresponding European patent application No. EP22200804, dated Apr. 19, 2023, 24 pages (for informational purposes only).

Marvel, Jeremy A. et al., "Characterizing Task-Based Human-Robot Collaboration Safety in Manufacturing", IEEE Transactions on systems, man, and cybernetics: systems, Feb. 2015, pp. 260-275, vol. 45, No. 2.

Chinniah, Y., "Robot safety: overview of risk assessment and reduction", Journal Advances in Robotics & Automation, 2016, vol. 5, issue 1, 5 pages.

Vicentini, Federico et al., "Safety assessmnet of collaborative robotics through automated formal verification", IEEE Transactions on robotics, Feb. 2020, pp. 42-61, vol. 36, No. 1.

Ogorodnikova, Oleasya, "Human Robot Interaction: The Safety Challange (An integrated frame work for human safety", 2010, 124 pages, Budapest University of Technology and Economics, Faculty of Mechanical Engineering, Department of Mechatronics, Optics and Engineering Informatics, Budapest.

ISO 12100:2010(E), "Safety of machinery—general principles for design—risk assessment and risk reduction", Nov. 1, 2010, 83 pages, retrieved Apr. 11, 2023.

* cited by examiner

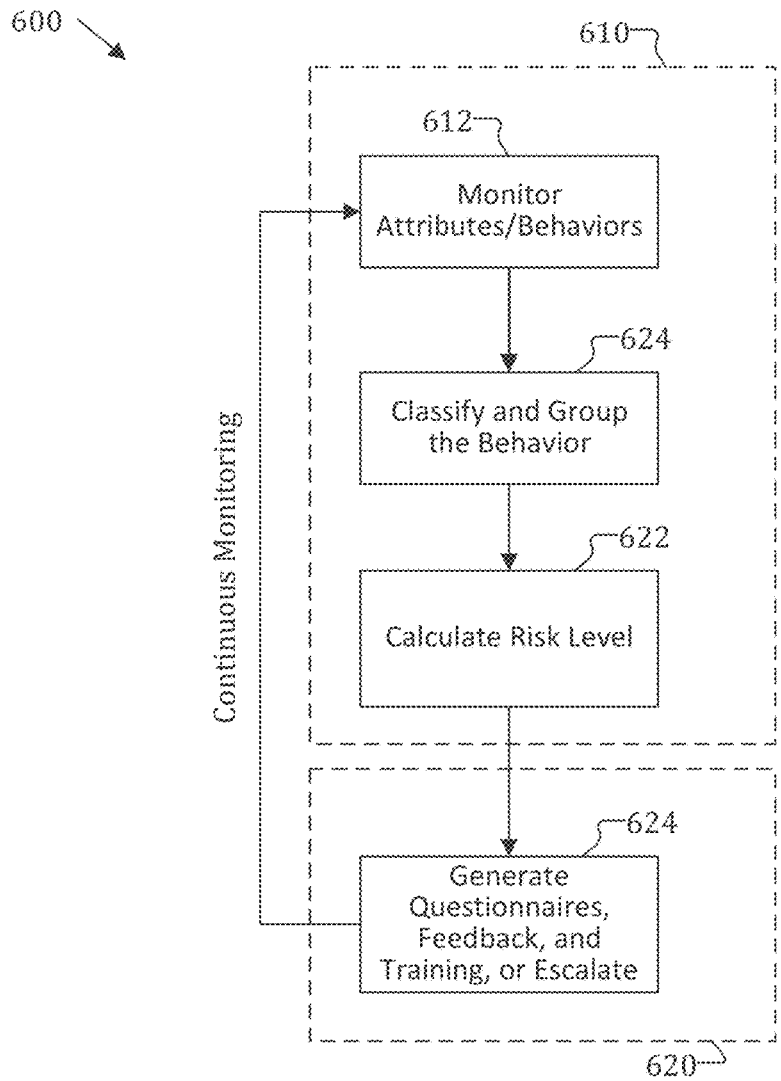

Please select which statements you agree with regarding your Safety Knowledge with respect to your collaborative task of passing a box to the robot?

- I have little to no knowledge about safety for this task
- I understand the *necessary* task safety requirements and general onsite hazards
- I understand *all* task safety requirements and *all* onsite hazards
- I know how to control or avoid all potential hazards according to safety procedures
- I am highly recognized by my immediate boss and workmates for my work experience and Safety Knowledge

FIG. 7

SITUATION-AWARE SAFETY ASSESSMENT OF ROBOT-HUMAN ACTIVITIES

TECHNICAL FIELD

The disclosure relates generally to robot safety, and in particular, to systems, devices, and methods that relate to robot safety in environments where there may be other humans in the vicinity of and/or collaborating with a robot.

BACKGROUND

Autonomous robots are becoming increasingly widespread in work and personal environments. As the number of robots in such environments increases, so does the risk of hazardous interactions among robots and humans in shared spaces. Due to their size and cost, many robots may have limited sensing, processing, and decision-making capabilities, which means that their movements may be limited to a handful of tasks, and such robots may not be capable of assessing, reacting to, and resolving complex interactions. To ensure safety, such task-oriented robots may simply stop their planned activities when persons are nearby or when they encounter a complex interaction. This may result in decreased efficiency when robots must share working spaces with persons or other robots, where the presence of humans may cause the robot to stop operations more frequently than would be desired.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which:

FIG. 6 illustrates an exemplary flow chart of a safety system for analyzing and improving the safety of robot-human collaborative environments;

FIG. 7 depicts an exemplary safety questionnaire that a safety system may provide to a human collaborating with a robot;

DESCRIPTION

Figure 1:
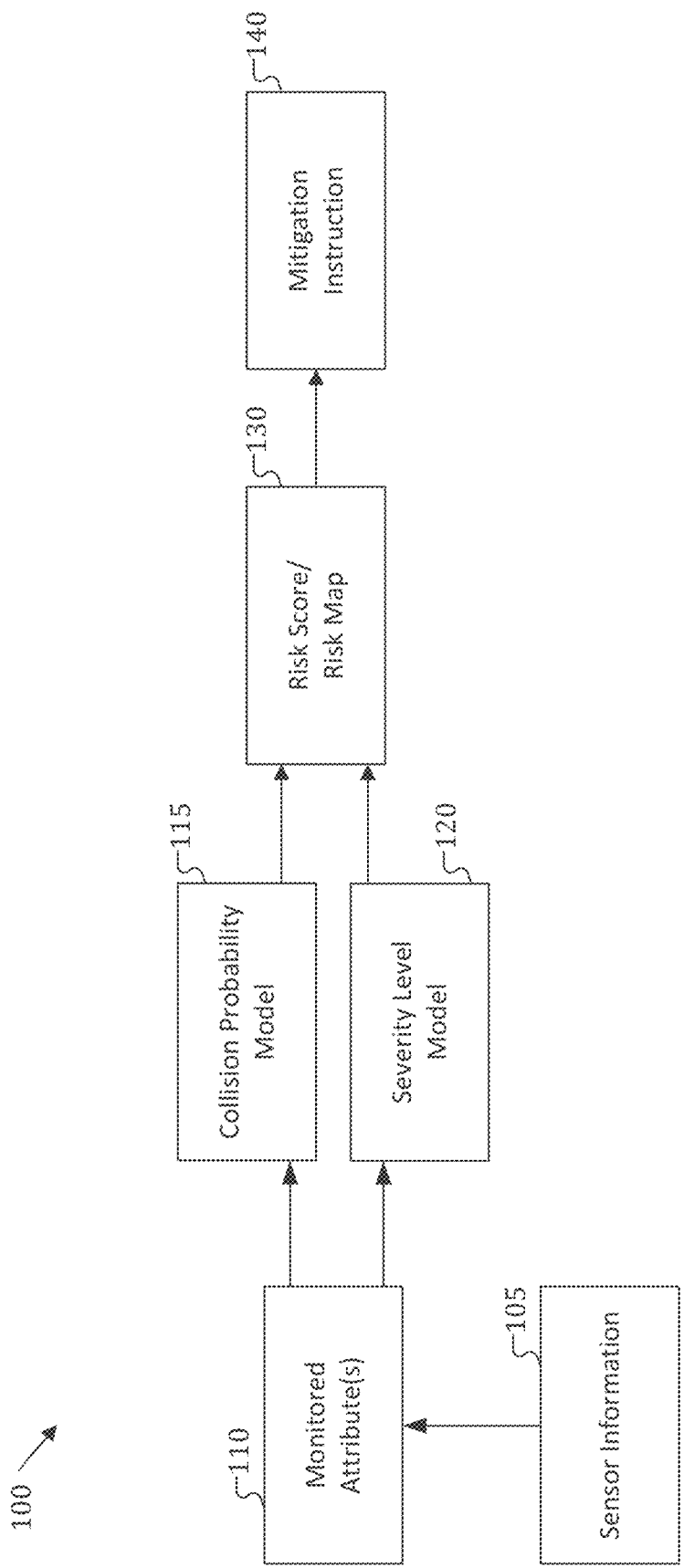
FIG. 1 shows an exemplary safety system for analyzing and improving the safety of collaborative environments in which a robot may interact with humans.

The following detailed description refers to the accompanying drawings that show, by way of illustration, exemplary details and features.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc., where "[ . . . ]" means that such a series may continue to any higher number). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc., where "[ . . . ]" means that such a series may continue to any higher number).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "robot" may be understood to include any type of digitally controllable machine that is designed to perform a task or tasks. By way of example, a robot may be an autonomous mobile robot (AMR) that may move within an area (e.g., a manufacturing floor, an office building, a warehouse, etc.) to perform a task or tasks; or a robot may be understood as an automated machine with arms, tools, and/or sensors that may perform a task or tasks at a fixed location; or a combination thereof. In addition, reference is made herein to a "human" or a "person" that may collaborate or share a space with a robot. As should be appreciated, the disclosed systems, methods, and devices, are not limited to strictly human collaborations and it should be understood that a "person" or "human" may in fact be other, non-human entities that share a space with or collaborate with a robot.

As robots become more prevalent in our daily lives, it is more likely that robots will operate in shared spaces, where aspects of the shared space may be constantly changing. This is especially true where human workers may interact with robots and may be in close proximity to a robot when it is operating. Such a situation may lead to unsafe conditions for the human and/or robot. Robots may have limited sensing, processing, and decision-making capabilities, so they may not be capable of assessing, reacting to, and resolving complex interactions to ensure a safe environment. To provide safety, conventional robots may use rudimentary safety routines that simply stop their planned activities if a person enters the room or workspace, if a complex interaction is detected, or if an unexpected situation arises. This may result in frequent stoppages in environments shared between robots and humans. In addition, unsafe situations or accidents may occur when robots interact with humans due to the unpredictable nature of a human interaction, were humans may skip collaborative steps due to insufficient work experience, fatigue, or other distractions.

As should be apparent from the detailed disclosure below, the disclosed system may reduce the inefficiency of conventional robots that operate in collaborative environments by monitoring the environment, determining human attributes and behaviors with respect to the robot, assessing the risk of the particular situation, and adapting the robot's actions to conform to safety parameters that are commensurate with the particular situation. This means the robot need not necessarily stop its planned activities if a person enters the room or workspace, if a complex interaction is detected, or if an unexpected situation arises. The system may constantly monitor the collaboration in real-time for safety risks, and the system may adapt the robot's behavior to narrowly address those risks without necessarily fully stopping its movements/task. As a result, the robot may enjoy fewer stoppages in collaborative environments while also maintaining a safe working environment.

FIG. 1 shows a safety system 100 for analyzing and improving the safety of collaborative environments in which a robot may interact with humans to accomplish a common work task. Safety system 100 may make a situational-aware risk assessment that may be based on human behavior, the human's level of distraction, the human's clothing, or the human's equipment (e.g., safety equipment) that are determined from sensor data that monitors the human, the robot, and/or the collaboration environment. Depending on the severity and probability of a dangerous interaction (e.g., a collision), the system may adapt the robot's motion to mitigate the safety risk.

Safety system 100 may be implemented as a device with a processor that is configured to operate as described herein. The device may operate as part of a server that is remote to the robot (e.g., a cloud-based server), may be integrated into the robot, or may have processing/sensors that are distributed across various locations. The safety system 100 may include a receiver, transmitter, and/or transceiver for communicating information among the various processing locations.

Safety system 100 may receive (e.g. via a receiver) the sensor information, in module 105, from sensors that monitor the environment in which the robot and human may be collaborating. Such sensors may include, as examples, a depth sensor, a camera, a radar, a light ranging and detection (LiDAR) sensor, a microphone, a health-monitoring sensor (e.g., a heart-rate monitor), a motion sensor, a gyroscopic sensor, an accelerometer, and/or an ultrasonic senor. As should be appreciated, safety system 100 may utilize any type of sensor to provide the received sensor information about the collaboration environment, and the sensor may be part of safety system 100, remote to safety system 100, part of the robot, attached to the human, and/or distributed among any number of sensors and any number of sensing locations. For example, a camera may be at a fixed location of a manufacturing facility that is able to monitor the activities on the manufacturing floor, including the robots and humans that be engaged in tasks and/or moving about manufacturing floor. A camera may also be part of or attached to the robot, where such a camera is able to observe the immediate environment of the robot. As another example, a human may wear a health-monitoring sensor such as a wearable heart-rate monitor that is able to record the heart rate of the human wearing the sensor. As another example, a microphone may be present at the collaboration space or within the manufacturing facility that is able to detect and localize sounds emitted within the environment.

Safety system 100 may provide the sensor information received in module 105 to a monitored attributes module 110, where the safety system 100 may use the received sensor information to determine monitored attributes associated with the collaboration between the robot and the collaborating person. Such monitored attributes may include, for example, facial identification of the person, emotion recognition of the person, speech recognition of the person, sound classification of environmental sounds at the collaboration site, health monitoring of the person, equipment information about safety equipment worn by the person (e.g., personal protective equipment, safety goggles, head protection, ear protection, hand protection, foot protection, an emergency-off button, etc.), an identification profile for the person, training information about a training level of the person (e.g., a level of training in each task associated with the collaboration), a distraction level of the person, a response time of the person, or other monitored behaviors (e.g., movements, postures, etc.) of the person.

The monitored attributes module 110 may score each monitored attribute with a probability score (e.g., a confidence level) associated with the likely accuracy of the determination. In addition, the monitored attributes module 110 may normalize the probability score or confidence level to a value from zero to one. As one example, the monitored attributes module 110 may detect that the person is wearing a helmet with a probability score (P) of $P_{helmet}=0.99$, whereas the monitoring module 100 may be able to detect that the person is wearing gloves with a lower confidence level (P), such as $P_{gloves}=0.2$. Of course, these probability scores are merely exemplary and the score may depend on the quality and quantity of the received sensor data and the ability of the monitored attributes module 110 to determine each monitored attribute based on the available sensor data. For this purpose, the safety system 100 may use an artificial intelligence learning model to detect objects based on the sensor data. The safety system 100 may also use an artificial intelligence learning model to classify each detected attribute and provide an associated probability score for the class of the detected attribute.

As another example, the monitored attributes module 110 may monitor whether the person is wearing other types of safety equipment objects (e.g., an emergency off button (EOB), an alarm button, etc.), and the safety system 100 may determine an associated probability score associated with the detected monitored attribute. As with the helmet and gloves example above, safety system 100 may use an artificial intelligence learning model for the detection and to assess a probability score associated with the detection. Of course, the detection of monitored attributes may depend on any sensor information from any number of sensors related to the monitored attribute. So, to detect the presence of an EOB, for example, a sensor may receive a radio-frequency identification (RFID) transmission from an EOB in the vicinity, and this may indicate with a high likelihood that the person is wearing an EOB. In this example, the probability that the monitored attributes module correctly detected an EOB may have a high probability score, e.g., $P_{EOB}=0.999$.

As another example, the monitored attributes module 110 may determine the tasks (e.g. movements) that the person is supposed to perform while collaborating with the robot. The tasks of the person may be predefined tasks/movements that the safety system 100 may know or may expect the person to perform as part of the collaboration between robot and human. The monitored attributes module 110 may utilize personal identification information received from sensor data (e.g., a badge scan) to identify the person and their predefined/expected task. If the safety system 100 does not know the predefined task, the monitored attributes module 110 may determine the task based on previous monitored movements of the person or may assume that the person is performing a task that will require the most conservative (e.g., safest) type of robot motions during the collaboration.

As another example, the monitored attributes module 110 may determine the training level or level of expertise with respect to the collaborative task. For example, the safety system 100 may not allow a person with insufficient training to collaborate with certain robots that perform intricate and/or highly dangerous tasks. The monitored attributes module 110 may receive sensor data (e.g., from a database of a central computing system via a receiver) that indicates the training level and/or level of expertise that a person may have with respect to a particular task (e.g., how many hours the person has logged with this particular robot and/or for this particular task). As with the probability scores discussed above, the monitored attributes module 110 may determine the training levels as step functions, higher order functions, and/or normalize them to floating point values between 0 (lowest level of training/expertise) and 1 (highest level of training/expertise).

The monitored attributes module 110 may also determine a distraction level of the person. For example, the monitored attributes module 110 may use sensor information to determine and monitor a field of view of the collaborating person, which the monitored attributes module 110 may estimate by tracking sensor information about the head movement, eye focus point, and/or posture of the person while engaged in collaboration with the robot. The monitored attributes module 110 may correlate the field of view with a position of the robot to determine a quantitative value for the distraction level, which the monitored attributes module 110 may normalize to a value from zero to one. For example, if the monitored attributes module 110 determines the person's field of view is toward the floor while the collaborating position with the robot is located directly ahead, the monitored attributes module 110 may determine a high distraction score (e.g., a value close to 1). On the other hand, if the monitored attributes module 110 determines that person's filed of view is directly toward the robot where the collaboration is taking place, the distraction score may be lower (e.g., a value of or close to 0). The monitored attributes module 110 may also determine the distraction score based on other factors indicative of, for example, a fatigue of worker, sounds in the environment, past practices, continuous working time, etc. For example, the monitored attributes module 110 may use sensor data indicative of fatigue, like an unstable gaze of the person's eyes, to increase the distraction score, or may use sensor data indicative of the continuous time in which the person has been performing a repetitive task in order to increase the distraction score (e.g., a long continuous time may lead to a high level of distraction). As another example, the monitored attributes module 110 may personalize the distraction core based on the particular worker and may be dependent on the skill level of the worker, level of training of the worker, the worker's track record of distraction with respect to similar tasks, etc.

The monitored attributes module 110 may also determine a behavior of the person based on the sensor information. For example, the monitored attributes module 110 may compare the measured behavior to an expected behavior to determine how well the person is performing a particular collaborative task. In this regard, the monitored attributes module 110 may determine a behavior-matching score (BMS) which determines the difference from an expected movement (e.g., a planned action of the person for the collaborative task) to a monitored action determined from the received sensor information. As with the other factors related to monitored attributes, the monitored attributes module 110 may normalize the behavior-matching score to a value from zero to one, according to, for example, the following formula:

$$BMS = \Delta(\text{Planned Action}, \text{Monitored Action}) \in [0,1]$$

Of course, the above-listed formula is merely exemplary, and the monitored attributes module 110 may calculate a behavior-matching score using any number of algorithms, including, for example, a clustering algorithm or based on a machine-learning model that associates expected behaviors with measured behaviors.

The monitored attributes module 110 may also determine a predicted behavior of the person at a future time during the collaboration (e.g., a trajectory representing expected positions of the person at future times). For example, the monitored attributes module 110 may use the expected task and/or sensor information indicative of the person's current position, posture, pose, movement, heading, speed, acceleration, etc., to predict the person's behavior at a future time, according to any type of behavior predictor (e.g., a long short-term memory (LSTM) algorithm, other rule-based approaches, etc.). The monitored attributes module 110 may also estimate a confidence level associated with the determined predicted behavior, where the confidence level reflects how likely it is that the person's actual behavior will follow the predicted behavior. For this purpose, the monitored attributes module 110 may use, for example, the inverse of the behavior-matching score (BMS) discussed above such that the confidence level of the prediction may be expressed as:

$$C_{behavior} = 1 - BMS.$$

In addition, the monitored attributes module 110 may adjust the confidence level of the prediction based on whether previous predictions were accurate by comparing actual observations to previous predictions. For example, if the previously predicted behavior matches the actual observations of those behaviors, the monitored attributes module 110 may increase the confidence score (e.g., if the predictions have been accurate for a long time) or remain constant (e.g., if the predictions have been accurate for a short time). On the other hand, if the previously predicted behavior does not match the actual observations of those previous behaviors, the monitored attributes module 110 may decrease the confidence score to a lower confidence value.

The monitored attributes module 110 may also determine a response time of the person which may relate to the predicted behavior and/or its associated confidence level. Response time may be understood to be the expected time it would take for a person to react to a movement of the robot. Of course, the monitored attributes module 110 may use any sensor information or determined attributes to determine response time, including, for example, distraction level, training/expertise level, and previous response times calculated for this person, etc. In this regard, the response time ($t_{response}$) may be expressed as a function (g) of these multiple variables (distraction, training, $C_{behavior}$) for the particular task (task), as in the following exemplary formula: $t_{response} = g(\text{distraction}, \text{training}, C_{behavior}, \text{task})$.

The response time may also be understood as being composed of a base response time $t_{base}$ that depends on the given task (task) and the person's level of training (training) for that task, multiplied by weighted factors that may impact the base response time, including, for example, the distraction level and/or the confidence level of the predicted behavior. This is reflected in the formula below for response time, where a is the weight for the distraction factor and b is the weight for the confidence factor:

$$t_{response} = t_{base}(\text{training, task}) * \left( \frac{a+b}{a*(1-\text{distaction}) + b*C_{behavior}} \right)$$

As should be appreciated, a person with better-training or more experience will typically have a shorter base response time, whereas difficult tasks may have a longer base response time compared to simple tasks with a shorter base response time. To obtain the base response times, the monitored attributes module 110 may utilize a lookup table that relates, for each task to be performed, a training/expertise level with a base response time. In addition, the lookup table may use any other monitored attribute or attributes as dimensions in the lookup table. As one example, the monitored attributes module 110 may use a lookup table of base response times that is unique to a particular person.

The second component of the above-listed exemplary formula for response time is an adjustment factor that accounts for other monitored attributes that may have an impact on the base response time. In the exemplary formula above, the distraction level and confidence level of the predicted behavior are used as an inverse weighted average to increase or decrease the base response time. In this regard, as the distraction value becomes higher (e.g., toward a value of 1) or as the confidence in the prediction becomes lower, (e.g., toward a value of 0), this will increase the response time (e.g., towards infinity), while as the distraction value increases (e.g., toward a value of 0) or as the confidence in the prediction increases (e.g., toward a value of 1) the determined response time will tend toward the base response time. As should be appreciated, this formula is merely exemplary, and the monitored attributes module 110 may use any number of probabilistic models to determine response time, including any number of factors (e.g. monitored attributes) that may influence the determined response time, and therefore the predicted behavior and associated confidence level in the prediction.

The safety system 100 may then use the monitored attributes determined in the monitored attributes module 110 to determine a collision probability according to a collision probability model 115 and a severity level according to a severity level model 120. These models may be based on the current actions of the person and any of the monitored attributes discussed above with respect to monitored attributes module 110 (e.g., the distraction of the person, the person's training level, the personal protective equipment worn by the person, the response time, the predicted behavior, etc.).

The collision probability may be understood as a likelihood that, during a planned operation of the robot, an unsafe event will occur. For example, as part of coordinated work operations where a robot is collaborating with a person, the person may be prone to cause an interference with (e.g., collides with) the robot. The safety system 100 may determine, for a given task, the collision probability according to the collision probability model 115 and based on any of the monitored attributes from the monitored attributes module 110. Thus, the collision probability ($P_{collision}$) may be expressed as function of the given task and the predicted behavior associated with that task: $P_{collision}$=f(task, behavior)

As should be appreciated, the given task may have an influence on the planned trajectory of the robot while the monitored attributes (e.g., the predicted behavior of the human) may indicate whether the collaborating human is likely to interfere (e.g., collide with) the planned trajectory of the robot. The collision probability model 115 may be a proximity-based collision model using the predicted human trajectory (e.g., based on the estimated response time of the human for the given task) and using the planned robot trajectory associated with the collaboration in order to determine distance between the robot and human at future points in time. One possible realization of such a probabilistic collision model may be expressed by the following formula:

$$P_{collision} = \int P(t)S(t)dt$$

In the above-listed formula, P(t) is a proximity-based instantaneous collision rate as a function of time t, and S(t) is a survival probability that represents the likelihood that no other collision occurred before time t. Hence:

$$S(t)=\exp\{-\int^t P(t')dt'\}$$

Accordingly, the instantaneous collision rate at time t may be estimated as follows:

$$P(t) = \tau \frac{1 - e^{-\beta I(t)}}{1 - e^{-\beta}}, \text{ where}$$

$$I(t) = \frac{1}{2}\left[\text{erf}\left\{\frac{d_0 - d(t)}{\sqrt{2}\sigma(t)}\right\} + 1\right]$$

In the above-listed exemplary formulas, $\tau$ and $\beta$ are model parameters, $d_0$ is the smallest allowed distance between the robot and the human, d(t) is the distance between the robot and the human at time t (e.g., estimated based on a corresponding future trajectory of each of the robot and human), and $\sigma$ represents the position uncertainty. As should be appreciated, the above proximity-based collision model is merely an exemplary model for the probabilistic collision model 115, but the safety system may use any number of suitable collision models for determining the probability of a collision between robot and human for a given task at a given point in time.

With respect to the severity level model 120, the severity level may be understood as the extent of harm that may result if the collision actually occurs. The severity level model 110 may be based on the current actions of the person and any of the monitored attributes discussed above with respect to monitored attributes module 110 (e.g., the distraction of the person, the person's training level, the personal protective equipment worn by the person, the response time, the predicted behavior, etc.). In this regard, the severity level associated with a collision ($S_{collision}$) may be expressed a function (h) of any number of the monitored attributes:

$$S_{collision}=h(PPE,EOB,Task,Robot\ Motion,\ldots)$$

The safety system 100 may implement the severity level model 120 with, for example, a lookup table that associates a predetermined severity level with a classified set of monitored attributes for a given task. A portion of an exemplary lookup table is listed below, where S1 may indicate a low severity (e.g., light injury), S2 may indicate a medium severity (e.g., severe injury), and S3 may indicate a high severity (e.g., possible fatal injury).

| SEVERITY | PERSONAL PROTECTIVE EQUIPMENT | EOB | TASK |
|---|---|---|---|
| S1 | Special helmet, glasses, gloves, special clothes, and shoes | No | Robot to weld next to human |
| S2 | Special helmet, glasses | No | Robot to weld next to human |
| S3 | None | No | Robot to weld next to human |

Of course, it should be appreciated that safety system 100 may use other methods beyond a lookup table to implement the severity level model 120, including, for example through a physical collision model that uses the monitored attributes and other sensor data to estimate accelerations for each part of the human body that may be impacted by such a collision and, determine a severity based on the estimated accelerations.

After safety system 100 has determined a severity level in the severity level module 120, the risk module 130 may use the severity level, collision probability, and/or monitored attributes to determine a risk score and/or risk map for the collaboration (e.g. the planned operation) between the robot and human. For example, the risk module 130 may determine a risk score by multiplying the determined collision probability with the determined severity level:

$$R=P_{collision} \times S_{collision}$$

To the extent the determined severity level is in the form of a severity class, such as "S1" or "S2" or "S3" as discussed above with respect to the lookup table, each severity class may be associated with a quantitative value for the severity level, which allows the risk module 130 to determine a risk value mathematically. The associated quantitative value for the severity level may also be in the form of a cost value, which may define a mathematical relationship between the severity level for a given class, the collision probability, and the resulting risk value. An example of this mathematical relationship is shown for example in FIG. 2.

Figure 2:
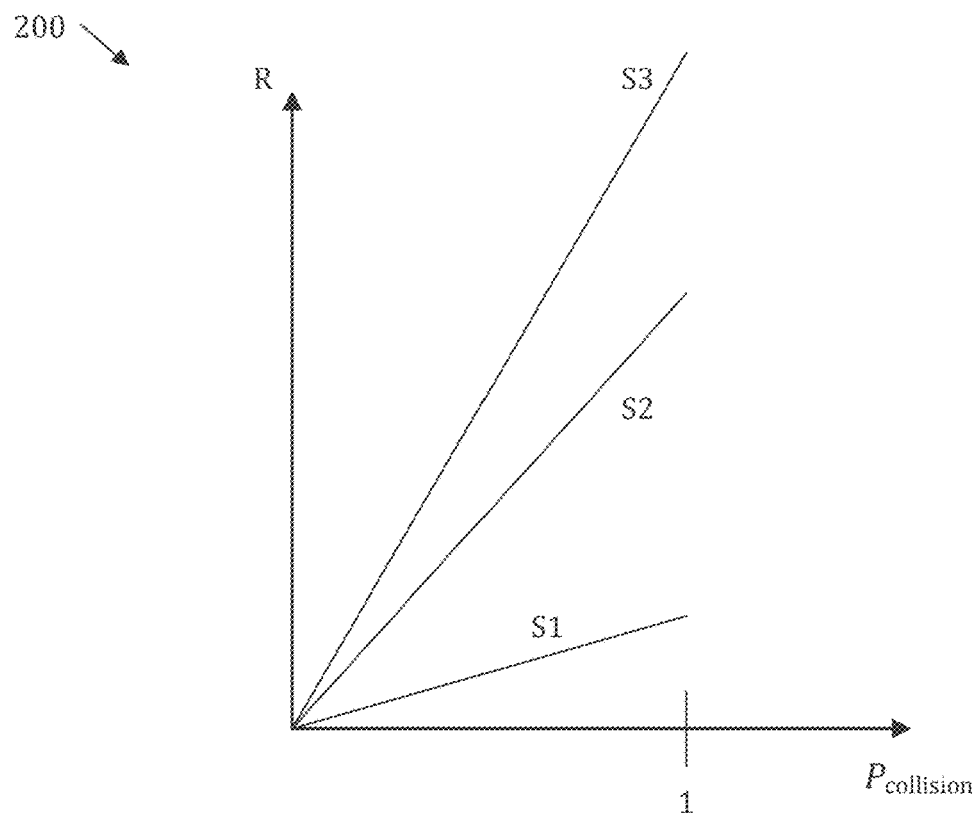
FIG. 2 shows an exemplary plot of an exemplary relationship between severity level, collision probability, and risk level.

FIG. 2 is a plot 200 that shows each of three severity levels (S1, S2, and S3), plotted as lines with respect the collision probability, $P_{collision}$, along on the horizontal X-axis, and the resulting risk level, R, along the vertical Y-axis. While S1, S2, and S3 are shown as having a linear relationship between collision probability and risk level, the defined relationship need not be linear, and any number of higher order functions may define the relationship, resulting in stepwise or curved lines.

Figure 4:
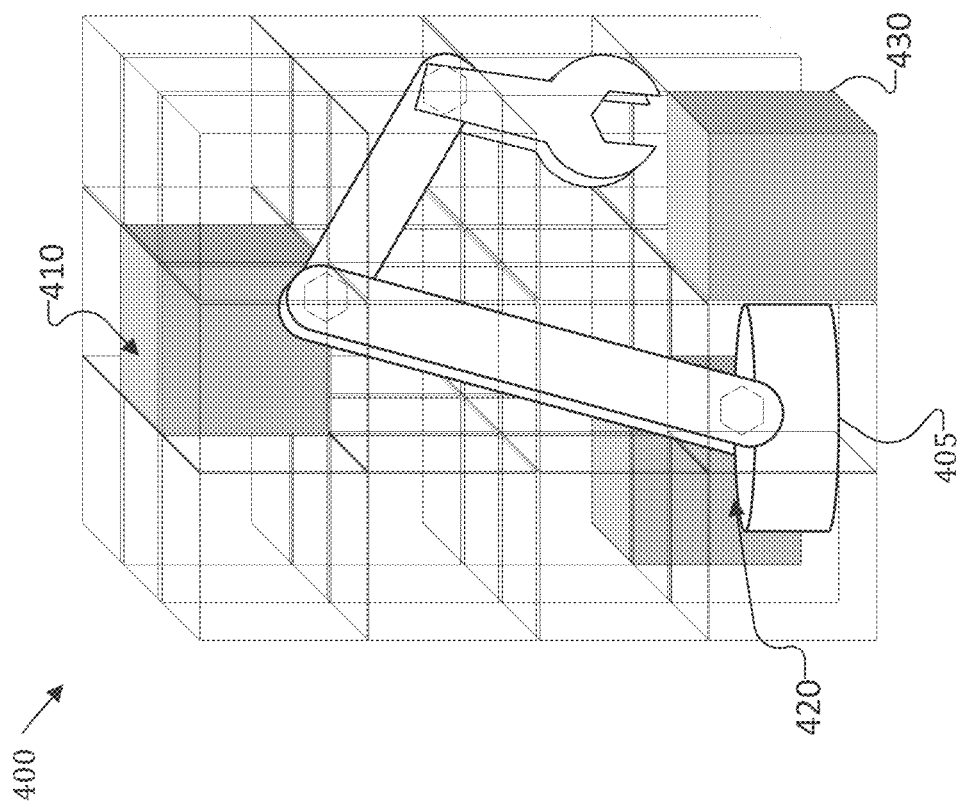
FIG. 4 depicts an exemplary risk map for the region around a robot.

Risk module 130 may also generate the risk score as a risk map of risk scores associated with a particular subregion around the robot. In other words, risk module 130 may calculate a risk score for each subregion of a three-dimensional grid of discrete subregions around a robot's possible movement space. FIG. 4 shows, for example, a risk map 400 calculated for the region around robot 405. As shown in FIG. 4, the immediate region around robot 405 has been discretized into a three-dimensional, three-by-three-by-four grid of blocked areas (e.g., blocks or subregions), with three blocks along the Z-axis, three blocks along the X-axis, and four blocks along the Y-axis. In a risk map such as risk map 400, each block may have its own risk score associated with the block so as to differentiate subregions with a higher risk score as compared to subregions with a lower risk score. In FIG. 4, for example, risk blocks 410, 420, and 430, have been highlighted differently from the remaining blocks to indicate that each of these areas are associated with a higher risk score as compared to the other blocks in risk map 400. As will be apparent in the description that follows, a discretized risk map may be helpful for safety system 100 to determine a more sophisticated mitigation plan that is narrowly tailored to areas in the risk map that exceed a threshold risk level (e.g., dedicated actions may be triggered to reduce the risk in blocks of the risk map that have the highest risk scores).

Safety system 100 may then generate, in module 140, a mitigation instruction for the robot that may adapt the robot's motion in view of the determined risk level/risk map, and in particular, when the risk score exceeds a predefined threshold risk level. The mitigation instruction may be, for example, an instruction to simply stop the robot's movement until the risk score returns to an acceptable level below the threshold risk level. As another example, the mitigation instruction may be an instruction to adapt the robot's movement to a safer motion (e.g. a motion that is associated with a lower, more acceptable risk score). For example, an adaptive mitigation instruction may be one that reduces the speed of the robot's movement but does not necessarily stop the robot's movement. Another example of an adaptive mitigation instruction may be a change to the trajectory of the robot, a change in the rotational direction, a bypass maneuver of the robot, a change to the placement location of a workpiece, a repositioning of the robot within the work environment, etc. If safety system 100 determined a risk map for the area around the robot, the mitigation instruction may take into account each of the risk levels associated with each subarea around the robot in order to determine a mitigation instruction. For example, the mitigating instruction may be narrowly tailored so the changed motion now avoids certain subareas in the risk map (e.g., those subareas that exceed a threshold risk level).

In addition, the safety system 100 may select a mitigation instruction in module 140 based on an improvement to safety balanced against a degradation in efficiency it may cause to the collaborative task. In other words, the safety system 100 may search for mitigation instructions that improve the risk score to an acceptable threshold level while also maximizing a goal for the collaborative task (e.g., the speed, quality, or efficiency of task completion). To implement such a balancing strategy, the safety system 100 may generate risk scores (e.g., in risk module 130) and efficiency impacts for a plurality of possible mitigation instructions (e.g., trajectories), and then select the mitigation instruction that minimizes the risk (e.g. to at least a predefined risk threshold) while maximizing the efficiency (e.g., to at least a predefined efficiency level of, e.g., a minimum speed, an amount of progress, a quality of output, etc.) of the collaborative task. If the safety system 100 is unable to find an adaptive mitigation instruction that would satisfy the predefined criteria, the safety system 100 may resort to a stop instruction for the robot to stop its movement.

It should be appreciated that safety system 100 may operate continuously in order to monitor the safety of the situation by determining risk scores in in real-time, at regular intervals, or at irregular intervals. In addition, the safety system 100 may store information associated with each risk score (e.g., monitored attributes, received sensor information, risk scores, collision probabilities, severity levels, mitigating instructions, etc.) in a memory in order to log the safety over time and provide a means for comparing current safety to prior safety. This allows the safety system 100 to continuously adapt the robot's motion/movements, via mitigation instructions, to continuously respond to changes in the collaboration environment that may have an impact on the safety of the collaboration. In this regard, the safety system 100 may continuously calculate and re-calculate a safety score, continuously comparing it to a predefined risk score threshold, where if the safety score is below the predefined risk score threshold, the safety system 100 may refrain from providing a mitigating instruction until the risk score is above the predefined risk score threshold. If the risk score is above the predefined threshold, the safety system 100 may use adaptive mitigating instructions that adapt the robot's motion to motions that are associated with lower risks. In addition, the safety system 100 may use a maximum allowable risk score threshold, above which the safety system 100 no longer generates an adaptive mitigating instruction but rather generates a mitigating instruction to stop the robot's motion altogether.

Figure 3:
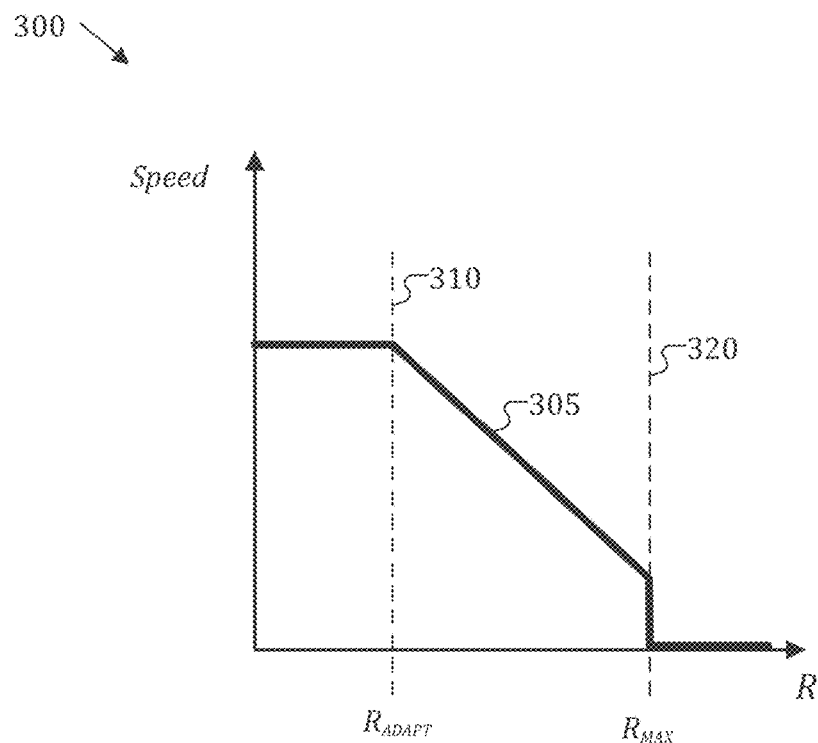
FIG. 3 depicts an exemplary plot of robot speed as function of risk level.

An example of these two thresholds are depicted, for example, in FIG. 3, where the safety system 100 is configured to lower the speed of the robot's motion as an adaptive mitigation instruction. As shown in plot 300 of FIG. 3, line 305 plots the speed (Speed) of the robot as a function of the risk score (R). Two different thresholds are also shown that correspond to different risk scores, threshold 310 and threshold 320. Threshold 310 is a predefined risk score threshold ($R_{ADAPT}$), above which the safety system 100 is configured to provide an adaptive mitigation instruction that adapts the speed of the robot's motion to lower values as a function of the risk score. Thus, when the risk score is below threshold 310 (i.e., to the left of $R_{ADAPT}$), the safety system 100 refrains from issuing mitigation instructions to adapt the speed, and the robot's speed remains at a high speed and unchanged by a mitigating instruction. If the risk score is above threshold 310 (i.e., to the right of $R_{ADAPT}$), the safety system 100 may issue a mitigating instruction to adapt the speed to a lower value as a function of the determined risk score.

Threshold 320 may be a maximum allowable risk score threshold ($R_{MAX}$), above which the safety system 100 is configured to provide a mitigation instruction that stops the robot's motion. Thus, when the risk score is above threshold 320 (i.e., to the right of $R_{MAX}$), the safety system 100 no longer adapts the speed of the robot but rather stops the robot's motion altogether. As can be seen in FIG. 3, line 305 drops to a speed of zero when the risk score is above threshold 320. As should be appreciated, the example of FIG. 3 is merely exemplary and the mitigating instruction need to be limited to the speed of the robot and may be any number of robot movements and motions, where each type of motion may have its own associated thresholds, each at different risk scores. In addition, the relationship between risk score and motion need not have the same shape as line 305, and the safety system 100 any use any shaped line to define such relationships.

Figure 5:
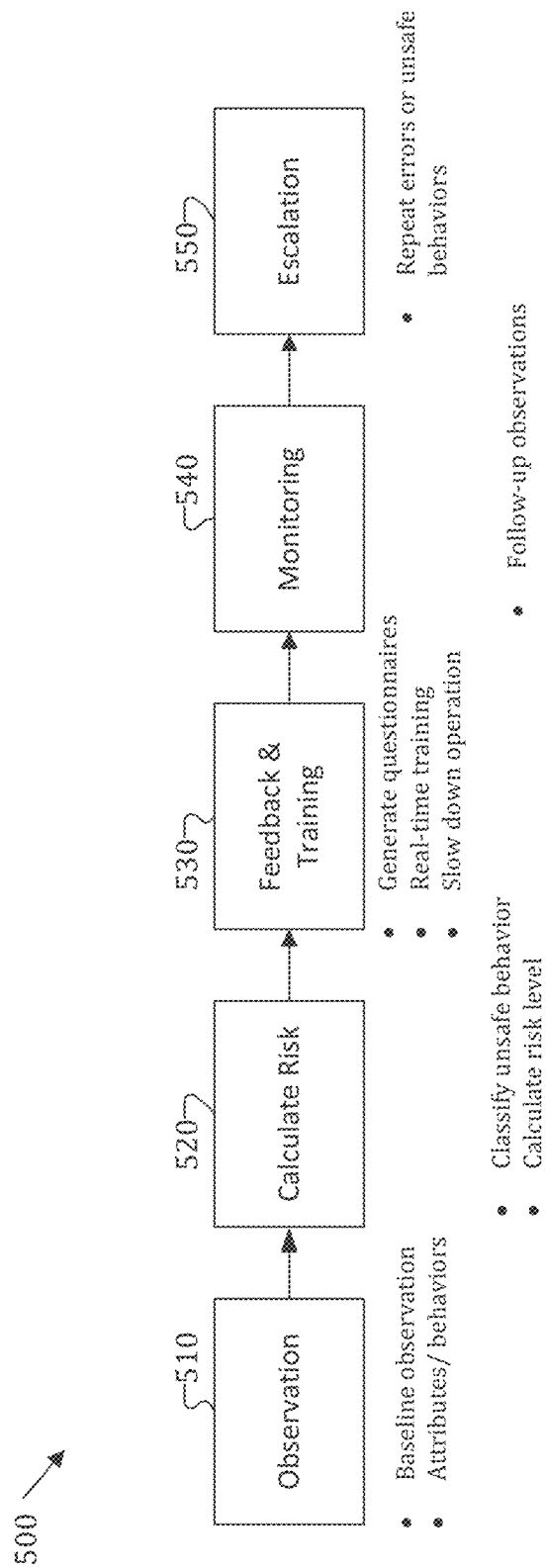
FIG. 5 shows an exemplary safety system for analyzing and improving the safety of robot-human collaborative environments.

FIG. 5 shows a safety system 500 that may be, may be included with, or may be part of aspects of safety system 100 described above. It should be appreciated that FIG. 5 is merely exemplary, and this example implementation is not intended to limit safety system 100, which may be implemented in any number of ways and may have any or none of the aspects discussed below with respect to safety system 500.

Safety system 500 may be a system for analyzing and improving the safety of collaborative environments in which a robot may interact (e.g., coordinate work operations) with humans to accomplish a common work task. Safety system 500 may make observations in observation module 510, of the collaborative environment. The observations may be any attributes of the environment, behaviors of the human, etc., including any of the monitored attributes discussed above with respect to monitored attributes 110 of FIG. 1, and they may be determined from any type of sensor information, including any of the sensor information 105 discussed above with respect to FIG. 1. Observation module 510 may make baseline observations of such attributes and behaviors that the safety system 500 may later use to determine a risk level in the calculate risk module 520.

For example, calculate risk module 520 may classify the observations received from the observation module 510 as unsafe behaviors and may calculate a risk level (e.g. a risk score as discussed above with respect to FIG. 1) for the corresponding observed attribute/behavior (e.g., a monitored attribute, discussed above with respect to FIG. 1). The feedback and training module 530 may then use the classified observation and/or the risk level in order to generate feedback or training for the human collaborator or to generate other mitigating instructions for the robot to modify its operation based on the risk level. The safety system 500 may continue, in monitoring module 540, to monitor the collaborative environment and make follow-up observations about the attributes and behaviors of the coordinate work operations between the robot and human. If the follow-up observations have worsened or have not improved with respect to the previously monitored baseline observations or if the observations show the human is repeating behaviors with risk levels that are too high, the safety system 500 may, in escalation module 550, may generate an instruction to stop the collaboration until a supervisor confirms that the work collaboration may continue.

FIG. 6 shows an exemplary flow chart 600 of safety system 500 in operation. It should be appreciated that FIG. 6 is merely exemplary, and flow chart 600 is not intended to limit safety system 500 to those features shown in flow chart 600.

In 612, the safety system may make observations of the collaborative environment. In 624, the safety system may classify and group the observations. In 622, the safety system may calculate a risk level. Together, 612, 624, and 622 may be understood as a human behavior analytics engine 610, that uses sensor information from the collaboration environment in order to rate the safety of the human's behaviors with respect to the collaborative work task. For example, the safety system may receive sensor information from multiple sources, including, for example cameras, microphones, motion sensors (e.g., gyroscope, accelerometer) (e.g. from a wearable device on the human), health sensors (e.g., from a wearable device on the human), etc. that may be classified and grouped into attributes/behaviors that the safety system monitors for safety purposes. For example, the human behavior analytics engine 610 may use the camera data for facial identification, emotion recognition, and expected motion recognition. As another example, the human behavior analytics engine 610 may use the microphone data for detecting conversations that the human may be having with coworkers, for speech recognition of the human, or for classifying/localizing sounds occurring within the collaboration environment. As another example, the human behavior analytics engine 610 may use the movement sensors to detect movements of the human and classify unusual movements. As another example, the human behavior analytics engine 610 may use the health sensor to measure the heart rate of the human and classify the working health condition of the human (e.g., a low heart rate may be classified as a tired worker or a high heart rate may be classified as an overexerted worker).

Based on the classified/grouped attributes/behaviors, the human behavior analytics engine 610 may use the classified/grouped attributes/behaviors (e.g., observations) to determine a risk level associated with the observations. For example, the human behavior analytics engine 610 may use the observations classified as unsafe behaviors to calculate a risk level (e.g. a risk score as discussed above with respect to FIG. 1) for the corresponding observed attribute/behaviors (e.g., a monitored attribute, discussed above with respect to FIG. 1). The human behavior analytics engine 610 may be located on a server that is remote to the robot (e.g. a cloud-based server), and/or it may use artificial intelligence or machine learning models to translate the sensor information into a risk score based on a risk weighting associated with the classified/grouped attributes/behaviors. For example, the human behavior analytics engine 610 may use artificial intelligence or machine learning models to translate the facial recognition, predicted trajectory/movements of the human, and speech recognition observations to an associated risk score. In addition, the human behavior analytics engine 610 may collect data from multiple collaborations in order to train the models, and the safety system may store any new or unrecognized attributes/behavior for updating/retraining the models.

Though not limiting, the artificial intelligence or machine learning models may be deep neural networks that use statistical models to map a set of sensor measurements and/or observations, using their associated weights, to arrive at a risk score. Given that the human behavior analytics engine 610 may receive sensor information from any number of sensors, to classify/group sensor information into a variety of observations, the learning model may use anomaly-detection techniques. For example, the learning model may be a simple convolutional neural network (CNN) model that is composed of two convolutional layers, where a first convolutional layer is followed by a max-pooling layer, and the output is generated through a fully-connected layer to produce continuous valued outputs. Because the output is real-valued, the safety system may train the learning model network through mean absolute error (MAE) as the loss function.

To calculate a risk level, for example, the human safety assessment engine 620 may utilize any number observations about the collaboration environment, including, but not limited to an identification of the worker (e.g. a badge number); a distraction level of the worker; a reaction time of the worker; a predicted trajectory of the worker; an experience level of the worker (e.g., years of experience); a training level of the worker (e.g. amount of training for this task); a velocity (e.g., fast, medium, slow, etc.), acceleration, pose, or movement of the robot; a current task associated with the collaboration (e.g., heavy, medium, light, etc.); and an expected motion of the worker. Each of these observations may have an associated unsafe human behavior classification (e.g., indicative of being distracted, being confused about the task, taking an abnormal action, an unhealthy condition, etc.) and may have an associated weighting (e.g., a discrete value from 0 to 1) for arriving at the risk level. As should be appreciated, the risk level (e.g., risk score) may be a discrete value, or it may be a categorized level within ranges (e.g., low, medium, high, etc.).

As an example calculation, assume that the human safety assessment engine 620 determines that the human is exhibiting the unsafe behavior of "being confused about the task," which has a value of 2.0 with an associated weighting of 0.9. The risk level may be determined by multiplying the value for this unsafe behavior with its associated weighting. Thus, the risk level may be calculated as: ((2.0)*(0.9))=1.8. The human safety assessment engine 620 may also express the risk level as a categorized level within ranges, where values between 0 and 1 may be categorized as a "Low Risk," values between 1 and 2 may be categorized as a "Medium Risk," and values higher than 2 may be considered a "High Risk." Of course, it should be appreciated that any scale of values, any number of categories, and any size of categorized level may be used to express the risk level.

In 624, the safety system may use the observations and/or the determined risk level from the human behavior analytics engine 610 in order to generate a mitigation instruction (e.g., feedback, questionnaires, training, or an escalation of the risk to a supervisor). 624 may be performed by a human safety assessment engine 620. For example, the human safety assessment engine 620 may generate a mitigation instruction in the form of a feedback/training module to instruct the worker how to remedy the unsafe behavior. The feedback may be in the form of a questionnaire (e.g., a series of five to eight short questions) that the human behavior analytics engine 610 may select based on the observed attributes and the risk level. For example, the human behavior analytics engine 610 may use the identification of the worker, the experience level of the worker, and the training level of the worker to tailor the set of questions to the particular worker and the particular collaborative task. The human behavior analytics engine 610 may provide the feedback as an audio steam played over speakers/headphones, a text message displayed on a screen, and/or a video displayed on a screen video. The human behavior analytics engine 610 may deliver the feedback/training through an artificial intelligence system (e.g. a chatbot). FIG. 7 shows an example questionnaire 700 that the human behavior analytics engine 610 may provide to a user. In addition, the safety system may receive the human's responses to the questionnaire and adapt the mitigation instruction (e.g., the modifications to the robot's motion) based on the received responses.

In addition, the safety system may continuously monitor the collaboration of the human and robot by reassessing the safety of the collaboration after the human behavior analytics engine 610 has delivered the feedback/training to the human. In this way, the safety system may operate in real-time, at regular intervals, or at irregular intervals to assess whether the safety has improved after providing the feedback/training. The safety system may return to module 612 in the human behavior analytics engine 610 to make new observations of the collaborative environment. If the risk level has worsened or not improved with respect to the previously calculated risk level, the safety system may, in 624, generate an instruction to modify the robot's actions to accommodate the human behavior or generate an instruction to stop the robot and escalate the situation to a supervisor, whereby the collaborative task remains stopped until a supervisor confirms that the work collaboration may continue.

Figure 8:
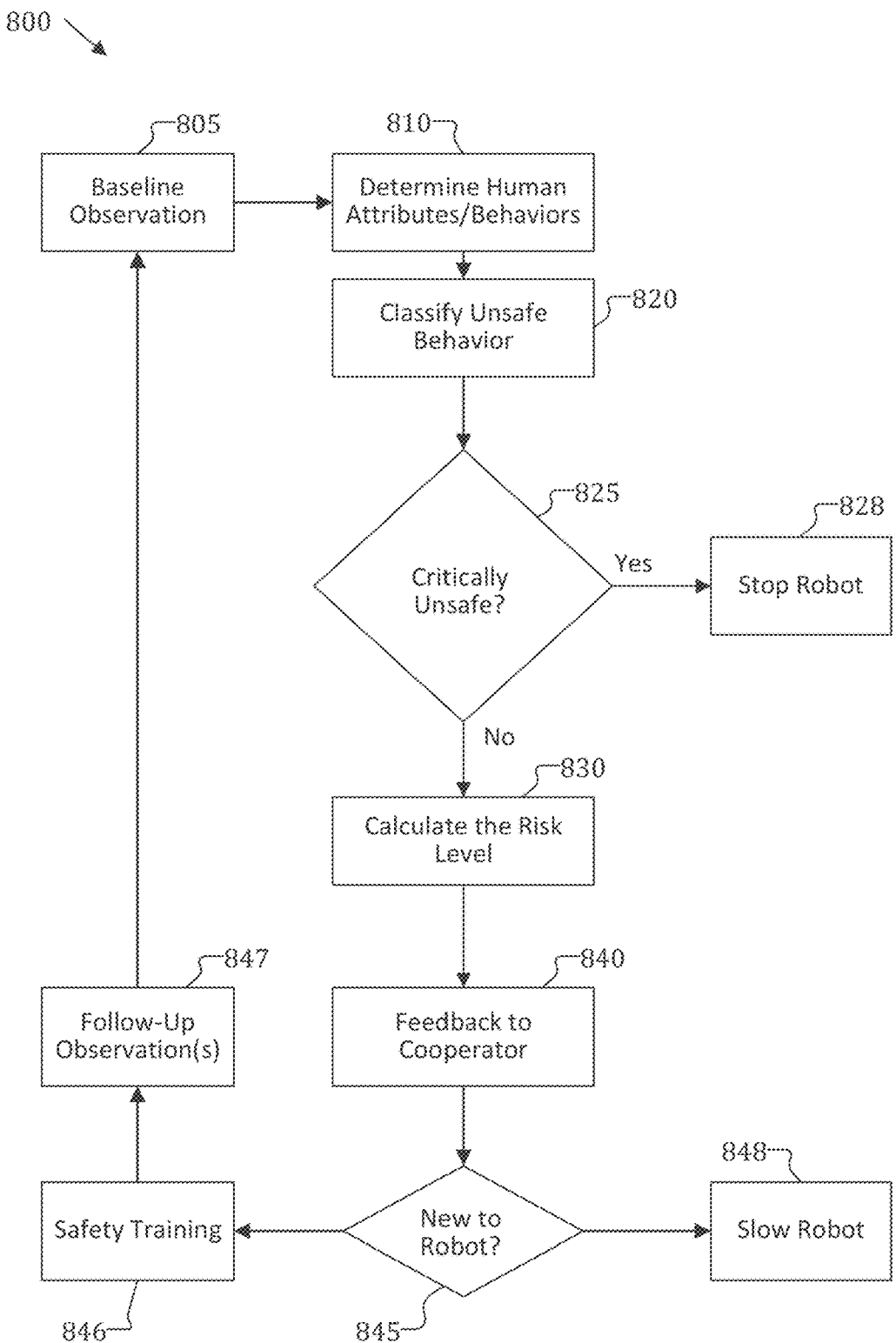
FIG. 8 illustrates an exemplary flow chart of a safety system for analyzing and improving the safety of robot-human collaborative environments.

FIG. 8 shows an exemplary flow chart 800 of safety system 500 in operation. It should be appreciated that FIG. 8 is merely exemplary, and flow chart 800 is not intended to limit the operation of safety system 500.

Operation may begin in 805, for example, where safety system 500 may make baseline observations of the collaborative environment from sensor information. In 810, the safety system 500 may use the baseline observations to determine monitored attributes/behaviors associated with the sensor information. In 820, the safety system 500 may classify the monitored attributes/behaviors as an unsafe behavior. In 825, the safety system 500 may assess whether the unsafe behavior is a critically unsafe behavior. If so, the safety system 500 may generate, in 828, an instruction to stop the robot so that the collaboration stops until the critically unsafe behavior has been resolved. If the behavior is not a critically unsafe behavior, the safety system 500 may calculate, in 830, the risk level based on the classified monitored attributes/behaviors. Next, depending on whether the risk level meets or exceeds a predefined threshold of risk, the safety system 500 may generate in 840 feedback (e.g. a mitigating instruction) based on the risk level and the monitored attributes/behaviors.

If the safety system determines, in 845, that the human operator is unfamiliar with the particular collaborative task and/or the robot (e.g., based on responses to a questionnaire and/or monitored attributes/behaviors that indicate a particular experience/training level), the safety system may adapt the robot's motion (e.g., slow down the robot) in 848 and/or may provide safety training to the human in 846. Next, the safety system may make a follow up observation in 847 in order to reassess the collaboration and return to 805 where the system may make new baseline observations from new sensor information to see if the risk level has improved. In this way the safety system 500 may continuously monitor the safety of the collaboration and monitor how the safety changes compared to the previous safety of the collaboration. To do this, the safety system may store in a memory the previous risk level, the previous observation (e.g., previous monitored attributes/behaviors), previous sensor information, and/or generated feedback for comparison to current values.

Figure 9:
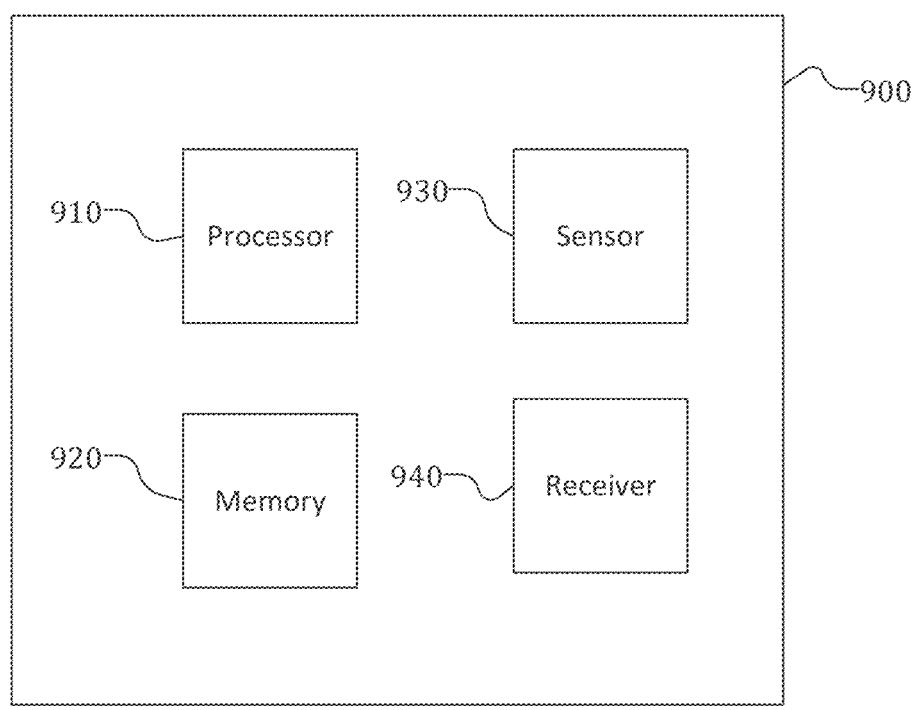
FIG. 9 illustrates an exemplary schematic drawing of a device for analyzing and improving the safety of robot-human collaborative environments.

FIG. 9 is a schematic drawing illustrating a device 900 for analyzing and improving the safety of collaborative environments in which a robot may interact (e.g., coordinate work operations) with humans to accomplish a common work task. The device 900 may include any of the features discussed above with respect to safety system 100 and/or safety system 500. FIG. 9 may be implemented as a device, a system, a method, and/or a computer readable medium that, when executed, performs the features of the safety systems described above. It should be understood that device 900 is only an example, and other configurations may be possible that include, for example, different components or additional components.

Device 900 includes a processor 910. In addition to or in combination with any of the features described in this or the following paragraphs, the processor 910 of device 900 may be configured to determine a monitored attribute of a person within an operating environment of a robot, wherein the monitored attribute is based on received sensor information about the person in the operating environment. In addition to or in combination with any of the features described in this or the following paragraphs, processor 910 is further configured to determine a risk score for the person based on the monitored attribute, wherein the risk score is defined by a collision probability that the person will cause an interference during a planned operation of the robot and a severity level associated with the interference. In addition to or in combination with any of the features described in this or the following paragraphs, processor 910 is further configured to generate a mitigating instruction for the robot if the risk score exceeds a threshold level.

Furthermore, in addition to or in combination with any one of the features of this and/or the preceding paragraph with respect to device 900, the robot may be configured to coordinate work operations with the person in the operating environment. Furthermore, in addition to or in combination with any one of the features of this and/or the preceding paragraph with respect to device 900, wherein the processor 910 configured to determine the monitored attribute may include the processor 910 configured to determine at least one of the following based on the received sensor information: equipment information about safety equipment worn by the person, an identification profile for the person, training information about a training level of the person with respect to the planned operation, a sound within the environment, a distraction level of the person, a response time of the person, or a monitored behavior of the person. Furthermore, in addition to or in combination with any one of the features of this and/or the preceding paragraph with respect to device 900, processor 910 may be configured to determine the risk score based on a behavior-matching score indicative of a difference between an expected behavior of the person and the monitored attribute. Furthermore, in addition to or in combination with any one of the features of this and/or the preceding paragraph with respect to device 900, processor 910 may be configured to determine the expected behavior based on an estimated trajectory of the person and an associated confidence level of the estimated trajectory.

Furthermore, in addition to or in combination with any one of the features of this and/or the preceding two paragraphs with respect to device 900, processor 910 may be configured to determine the collision probability based on at least one of a robot trajectory of the robot associated with the planned operation or an expected behavior of the person during the planned operation. Furthermore, in addition to or in combination with any one of the features of this and/or the preceding two paragraphs with respect to device 900, the device 900 may be incorporated into the robot. Furthermore, in addition to or in combination with any one of the features of this and/or the preceding two paragraphs with respect to device 900, device 900 may include a memory 920 configured to store at least one of the monitored attribute, received sensor information, the risk score, the collision probability, the severity level, or the mitigating instruction. Furthermore, in addition to or in combination with any one of the features of this and/or the preceding two paragraphs with respect to device 900, device 900 may be remote from the robot.

Furthermore, in addition to or in combination with any one of the features of this and/or the preceding three paragraphs with respect to device 900, processor 910 may be configured to determine the severity level based on at least one of the following: equipment information about safety equipment worn by the person, training information about a training level of the person with respect to the planned operation, or robot movements of the robot associated with the planned operation of the robot. Furthermore, in addition to or in combination with any one of the features of this and/or the preceding three paragraphs with respect to device 900, processor 910 may be configured to determine the severity level from a severity lookup table that associates severity levels with at least one of the following: the equipment information, the training information, or the robot movements. Furthermore, in addition to or in combination with any one of the features of this and/or the preceding three paragraphs with respect to device 900, processor 910 may be configured to determine the severity level based on grouping the received sensor information into a plurality of behavior categories, wherein each behavior category of the plurality of behavior categories has an associated weighting, wherein the severity level may include a weighted sum of each behavior category multiplied by the associated weighting.

Furthermore, in addition to or in combination with any one of the features of this and/or the preceding four paragraphs with respect to device 900, the mitigating instruction may include at least one of the following: a stop instruction for the robot to stop operating; or a modified instruction associated with a modified instruction risk level that is lower than the risk level, wherein processor 910 may be configured to determine the modified instruction risk level based on a collision probability of the modified instruction and a severity level of the modified instruction. Furthermore, in addition to or in combination with any one of the features of this and/or the preceding four paragraphs with respect to device 900, processor 910 may be configured to select the modified instruction from a plurality of possible modified instructions, wherein each possible modified instruction of the plurality of possible modified instructions is associated with a corresponding risk level of the possible modified instruction, wherein processor 910 may be configured to select the possible modified instruction based on the corresponding risk level. Furthermore, in addition to or in combination with any one of the features of this and/or the preceding four paragraphs with respect to device 900, processor 910 may be configured to select the possible modified instruction based on a progress level associated with the possible modified instruction, wherein the progress level is defined by progress toward completing the planned operation provided from the possible modified instruction.

Furthermore, in addition to or in combination with any one of the features of this and/or the preceding five paragraphs with respect to device 900, wherein the modified instruction may include a reduced speed of robot movements associated with the planned operation. Furthermore, in addition to or in combination with any one of the features of this and/or the preceding five paragraphs with respect to device 900, device 900 may further include a sensor 930 configured to provide the received sensor information about the person. Furthermore, in addition to or in combination with any one of the features of this and/or the preceding five paragraphs with respect to device 900, processor 910 may be configured to receive via receiver 940 the received sensor information. Furthermore, in addition to or in combination with any one of the features of this and/or the preceding five paragraphs with respect to device 900, sensor 930 may include a depth sensor, a camera, a radar, a light ranging and detection sensor, a microphone, a health-monitoring sensor, a heart-rate monitor, a motion sensor, a gyroscopic sensor, an accelerometer, and/or an ultrasonic senor. Furthermore, in addition to or in combination with any one of the features of this and/or the preceding five paragraphs with respect to device 900, the risk score may include a plurality of risk scores, wherein the environment may be subdivided into a plurality of subregions, wherein each risk score of the plurality of risk scores may include a regional risk score for a corresponding subregion of the plurality of subregions.

Furthermore, in addition to or in combination with any one of the features of this and/or the preceding six paragraphs with respect to device 900, processor 910 may be configured to determine the regional risk score based on a corresponding collision probability for the corresponding subregion and a corresponding severity level for the corresponding subregion. Furthermore, in addition to or in combination with any one of the features of this and/or the preceding six paragraphs with respect to device 900, the threshold level may include a plurality of subregion threshold levels, wherein each corresponding subregion of the plurality of subregions has an associated subregion threshold level from the plurality of subregion threshold levels, wherein the mitigating instruction may be configured to avoid corresponding subregions where the regional risk score for the corresponding region exceeds the subregion threshold level for the corresponding region. Furthermore, in addition to or in combination with any one of the features of this and/or the preceding six paragraphs with respect to device 900, wherein the monitored attribute of the person may include at least one of the following: a facial expression of the person; an emotional reaction of the person; a spoken word from the person; a movement of the person; a posture of the person; or a heart rate of the person.

Furthermore, in addition to or in combination with any one of the features of this and/or the preceding seven paragraphs with respect to device 900, the equipment information about safety equipment worn by the person may include an indication of at least one of a clothing worn by the person, a personal protective equipment worn by the person, an emergency off button worn by the person, safety glasses worn by the person, a helmet worn by the person, a glove worn by the person, or an ear plug worn by the person. Furthermore, in addition to or in combination with any one of the features of this and/or the preceding seven paragraphs with respect to device 900, processor 910 may be configured to generate a safety questionnaire for the person, wherein the safety questionnaire is based on at least one of the following: the risk score, the identification profile, the training information, or the monitored attribute. Furthermore, in addition to or in combination with any one of the features of this and/or the preceding seven paragraphs with respect to device 900, processor 910 may be configured to generate the mitigation instruction based on the questionnaire responses.

Furthermore, in addition to or in combination with any one of the features of this and/or the preceding eight paragraphs with respect to device 900, receiver 940 may be configured to receive questionnaire responses to the safety questionnaire from the person. Furthermore, in addition to or in combination with any one of the features of this and/or the preceding eight paragraphs with respect to device 900, processor 910 may be further configured to, based on the questionnaire responses, generate a stop instruction for the robot to stop operating or generate a modified instruction for the robot, wherein the modified instruction may include robot movements that take into account the questionnaire responses. Furthermore, in addition to or in combination with any one of the features of this and/or the preceding eight paragraphs with respect to device 900, wherein the safety questionnaire may include a teaching instruction that teaches the person about safety with respect to the planned operation of the robot.

Figure 10:
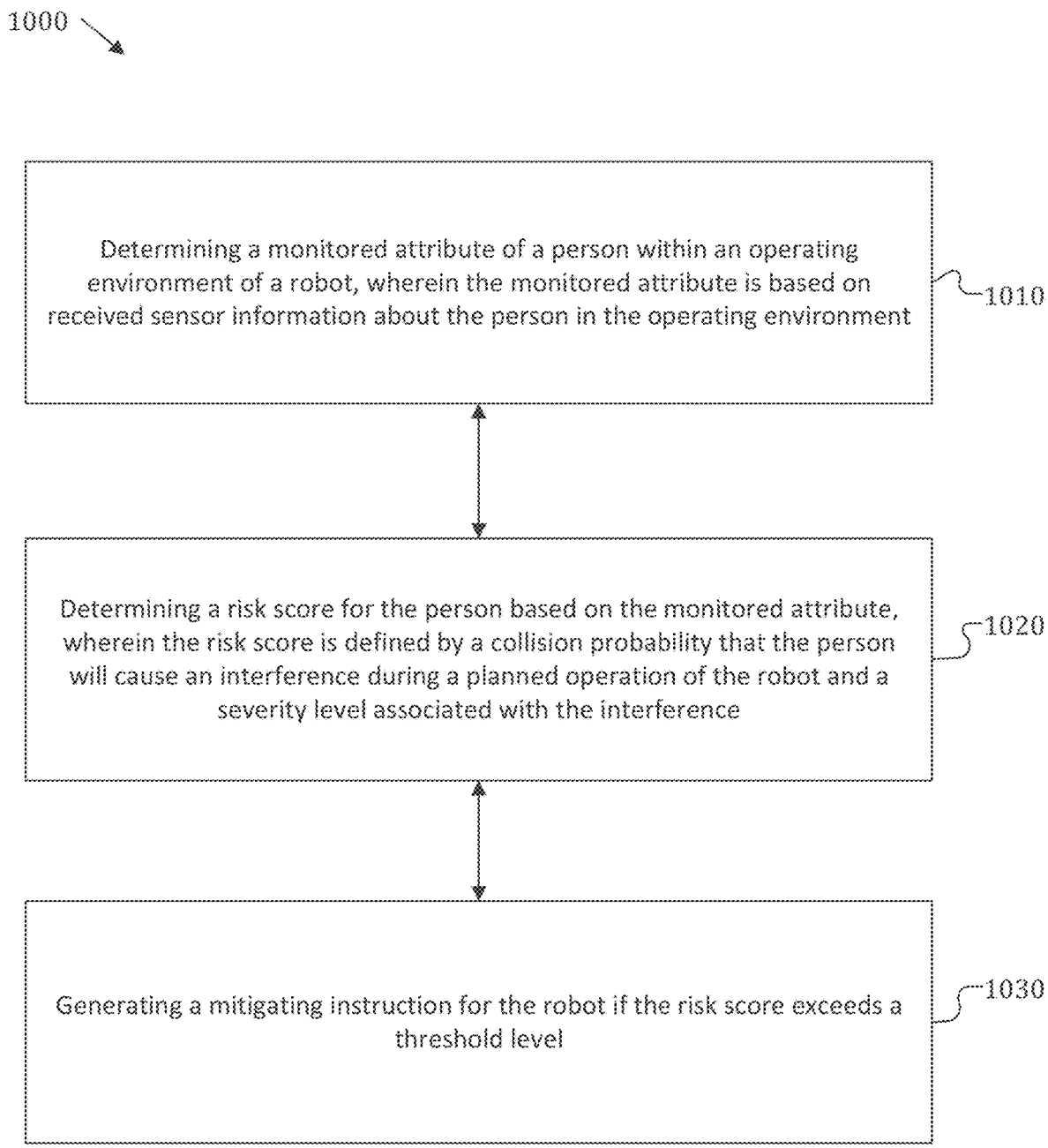
FIG. 10 depicts an exemplary schematic flow diagram of a method for analyzing and improving the safety of robot-human collaborative environments.

FIG. 10 depicts a schematic flow diagram of a method 1000 for analyzing and improving the safety of collaborative environments of robots and humans. Method 1000 may implement any of the safety system features described above with respect to safety system 100, safety system 500, and/or device 900.

Method 1000 includes, in 1010, determining a monitored attribute of a person within an operating environment of a robot, wherein the monitored attribute is based on received sensor information about the person in the operating environment. Method 1000 also includes, in 1020, determining a risk score for the person based on the monitored attribute, wherein the risk score is defined by a collision probability that the person will cause an interference during a planned operation of the robot and a severity level associated with the interference. Method 1000 also includes, in 1030, generating a mitigating instruction for the robot if the risk score exceeds a threshold level.

In the following, various examples are provided that may include one or more aspects described above with reference to safety system 300, safety system 500, device 900 and/or method 1000. The examples provided in relation to the devices may apply also to the described method(s), and vice versa.

Example 1 is a device including a processor configured to determine a monitored attribute of a person within an operating environment of a robot, wherein the monitored attribute is based on received sensor information about the person in the operating environment. The processor is further configured to determine a risk score for the person based on the monitored attribute, wherein the risk score is defined by a collision probability that the person will cause an interference during a planned operation of the robot and a severity level associated with the interference. The processor is further configured to generate a mitigating instruction for the robot if the risk score exceeds a threshold level.

Example 2 is the device of example 1, wherein the robot is configured to coordinate work operations with the person in the operating environment.

Example 3 is the device of either of examples 1 or 2, wherein the processor configured to determine the monitored attribute includes the processor configured to determine at least one of the following based on the received sensor information: equipment information about safety equipment worn by the person, an identification profile for the person, training information about a training level of the person with respect to the planned operation, a sound within the environment, a distraction level of the person, a response time of the person, or a monitored behavior of the person.

Example 4 is the device of any one of examples 1 to 3, wherein the processor is configured to determine the risk score based on a behavior-matching score indicative of a difference between an expected behavior of the person and the monitored attribute.

Example 5 is the device of example 4, wherein the processor is configured to determine the expected behavior based on an estimated trajectory of the person and an associated confidence level of the estimated trajectory.

Example 6 is the device of any one of examples 1 to 5, wherein the processor is configured to determine the collision probability based on at least one of a robot trajectory of the robot associated with the planned operation or an expected behavior of the person during the planned operation.

Example 7 is the device of any one of examples 1 to 6, wherein the device is incorporated into the robot.

Example 8 is the device of any one of examples 1 to 7, further including a memory configured to store at least one of the monitored attribute, received sensor information, the risk score, the collision probability, the severity level, or the mitigating instruction.

Example 9 is the device of any one of examples 1 to 8, wherein the device is remote from the robot.

Example 10 is the device of any one of examples 1 to 9, wherein the processor is configured to determine the severity level based on at least one of the following: equipment information about safety equipment worn by the person, training information about a training level of the person with respect to the planned operation, or robot movements of the robot associated with the planned operation of the robot.

Example 11 is the device of example 10, wherein the processor is configured to determine the severity level from a severity lookup table that associates severity levels with at least one of the following: the equipment information, the training information, or the robot movements.

Example 12 is the device of example 11, wherein the processor is configured to determine the severity level based on grouping the received sensor information into a plurality of behavior categories, wherein each behavior category of the plurality of behavior categories has an associated weighting, wherein the severity level includes a weighted sum of each behavior category multiplied by the associated weighting.

Example 13 is the device of any one of examples 1 to 12, wherein the mitigating instruction includes at least one of the following: a stop instruction for the robot to stop operating; or a modified instruction associated with a modified instruction risk level that is lower than the risk level, wherein the processor is configured to determine the modified instruction risk level based on a collision probability of the modified instruction and a severity level of the modified instruction.

Example 14 is the device of example 13, wherein the processor is configured to select the modified instruction from a plurality of possible modified instructions, wherein each possible modified instruction of the plurality of possible modified instructions is associated with a corresponding risk level of the possible modified instruction, wherein the processor is configured to select the possible modified instruction based on the corresponding risk level.

Example 15 is the device of example 14, wherein the processor is further configured to select the possible modified instruction based on a progress level associated with the possible modified instruction, wherein the progress level is defined by progress toward completing the planned operation provided from the possible modified instruction.

Example 16 is the device of any one of examples 13 to 15, wherein the modified instruction includes a reduced speed of robot movements associated with the planned operation.

Example 17 is the device of any one of examples 1 to 16, further including a sensor configured to provide the received sensor information about the person.

Example 18 is the device of any one of examples 1 to 17, wherein the processor is configured to receive the received sensor information from a sensor including a depth sensor, a camera, a radar, a light ranging and detection sensor, a microphone, a health-monitoring sensor, a heart-rate monitor, a motion sensor, a gyroscopic sensor, an accelerometer, and/or an ultrasonic senor.

Example 19 is the device of any one of examples 1 to 18, wherein the risk score includes a plurality of risk scores, wherein the environment is subdivided into a plurality of subregions, wherein each risk score of the plurality of risk scores includes a regional risk score for a corresponding subregion of the plurality of subregions.

Example 20 is the device of example 19, wherein the processor is configured to determine the regional risk score based on a corresponding collision probability for the corresponding subregion and a corresponding severity level for the corresponding subregion.

Example 21 is the device of example 20, wherein the threshold level includes a plurality of subregion threshold levels, wherein each corresponding subregion of the plurality of subregions has an associated subregion threshold level from the plurality of subregion threshold levels, wherein the mitigating instruction is configured to avoid corresponding subregions where the regional risk score for the corresponding region exceeds the subregion threshold level for the corresponding region.

Example 22 is the device of any one of examples 1 to 21, wherein the monitored attribute of the person includes at least one of the following: a facial expression of the person; an emotional reaction of the person; a spoken word from the person; a movement of the person; a posture of the person; or a heart rate of the person.

Example 23 is the device of any one of examples 3 to 22, wherein the equipment information about safety equipment worn by the person includes an indication of at least one of a clothing worn by the person, a personal protective equipment worn by the person, an emergency off button worn by the person, safety glasses worn by the person, a helmet worn by the person, a glove worn by the person, or an ear plug worn by the person.

Example 24 is the device of any one of examples 3 to 23, wherein the processor is further configured to generate a safety questionnaire for the person, wherein the safety questionnaire is based on at least one of the following: the risk score, the identification profile, the training information, or the monitored attribute.

Example 25 is the device of example 24 wherein the processor is configured to generate the mitigation instruction based on the questionnaire responses.

Example 26 is the device of either of examples 24 or 25, further including a receiver is configured to receive (from the person) questionnaire responses to the safety questionnaire.

Example 27 is the device of example 26, wherein the processor is further configured to, based on the questionnaire responses, generate a stop instruction for the robot to stop operating or generate a modified instruction for the robot, wherein the modified instruction includes robot movements that take into account the questionnaire responses.

Example 28 is the device of any one of examples 24 to 27, wherein the safety questionnaire includes a teaching instruction that teaches the person about safety with respect to the planned operation of the robot.

Example 29 is a method that includes determining a monitored attribute of a person within an operating environment of a robot, wherein the monitored attribute is based on received sensor information about the person in the operating environment. The method further includes determining a risk score for the person based on the monitored attribute, wherein the risk score is defined by a collision probability that the person will cause an interference during a planned operation of the robot and a severity level associated with the interference. The method further includes generating a mitigating instruction for the robot if the risk score exceeds a threshold level.

Example 30 is the method of example 29, wherein the robot is configured to coordinate work operations with the person in the operating environment.

Example 31 is the method of either of examples 29 or 30, wherein determining the monitored attribute includes determining at least one of the following based on the received sensor information: equipment information about safety equipment worn by the person, an identification profile for the person, training information about a training level of the person with respect to the planned operation, a sound within the environment, a distraction level of the person, a response time of the person, or a monitored behavior of the person.

Example 32 is the method of any one of examples 29 to 31, wherein determining the risk score includes determining the risk score based on a behavior-matching score indicative of a difference between an expected behavior of the person and the monitored attribute.

Example 33 is the method of example 32, the method further includes determining the expected behavior based on an estimated trajectory of the person and an associated confidence level of the estimated trajectory.

Example 34 is the method of any one of examples 29 to 33, wherein determining the collision probability includes determining the collision probability based on at least one of a robot trajectory of the robot associated with the planned operation or an expected behavior of the person during the planned operation.

Example 35 is the method of any one of examples 29 to 34, the method further including storing at least one of the monitored attribute, received sensor information, the risk score, the collision probability, the severity level, or the mitigating instruction.

Example 36 is the method of any one of examples 29 to 35, wherein the severity level is determined based on at least one of the following: equipment information about safety equipment worn by the person, training information about a training level of the person with respect to the planned operation, or robot movements of the robot associated with the planned operation of the robot.

Example 37 is the method of example 36, the severity level is determined from a severity lookup table that associates severity levels with at least one of the following: the equipment information, the training information, or the robot movements.

Example 38 is the method of example 37, wherein the severity level is determined based on grouping the received sensor information into a plurality of behavior categories, wherein each behavior category of the plurality of behavior categories has an associated weighting, wherein the severity level includes a weighted sum of each behavior category multiplied by the associated weighting.

Example 39 is the method of any one of examples 29 to 38, wherein the mitigating instruction includes at least one of the following: a stop instruction for the robot to stop operating; or a modified instruction associated with a modified instruction risk level that is lower than the risk level, wherein the method further includes determining the modified instruction risk level based on a collision probability of the modified instruction and a severity level of the modified instruction.

Example 40 is the method of example 39, the method further including selecting the modified instruction from a plurality of possible modified instructions, wherein each possible modified instruction of the plurality of possible modified instructions is associated with a corresponding risk level of the possible modified instruction, wherein the method further includes selecting the possible modified instruction based on the corresponding risk level.

Example 41 is the method of example 40, wherein the possible modified instruction is selected based on a progress level associated with the possible modified instruction, wherein the progress level is defined by progress toward completing the planned operation provided from the possible modified instruction.

Example 42 is the method of any one of examples 39 to 41, wherein the modified instruction includes a reduced speed of robot movements associated with the planned operation.

Example 43 is the method of any one of examples 29 to 42, wherein the received sensor information about the person is received from a sensor.

Example 44 is the method of any one of examples 29 to 43, wherein the sensor includes at least one of a depth sensor, a camera, a radar, a light ranging and detection sensor, a microphone, a health-monitoring sensor, a heart-rate monitor, a motion sensor, a gyroscopic sensor, an accelerometer, and/or an ultrasonic senor.

Example 45 is the method of any one of examples 29 to 44, wherein the risk score includes a plurality of risk scores, wherein the environment is subdivided into a plurality of subregions, wherein each risk score of the plurality of risk scores includes a regional risk score for a corresponding subregion of the plurality of subregions.

Example 46 is the method of example 45, wherein the regional risk score is determined based on a corresponding collision probability for the corresponding subregion and a corresponding severity level for the corresponding subregion.

Example 47 is the method of example 46, wherein the threshold level includes a plurality of subregion threshold levels, wherein each corresponding subregion of the plurality of subregions has an associated subregion threshold level from the plurality of subregion threshold levels, wherein the mitigating instruction is configured to avoid corresponding subregions where the regional risk score for the corresponding region exceeds the subregion threshold level for the corresponding region.

Example 48 is the method of any one of examples 29 to 47, wherein the monitored attribute of the person includes at least one of the following: a facial expression of the person; an emotional reaction of the person; a spoken word from the person; a movement of the person; a posture of the person; or a heart rate of the person.

Example 49 is the method of any one of examples 31 to 48, wherein the equipment information about safety equipment worn by the person includes an indication of at least one of a clothing worn by the person, a personal protective equipment worn by the person, an emergency off button worn by the person, safety glasses worn by the person, a helmet worn by the person, a glove worn by the person, or an ear plug worn by the person.

Example 50 is the method of any one of examples 31 to 49, the method further including generating a safety questionnaire for the person, wherein the safety questionnaire is based on at least one of the following: the risk score, the identification profile, the training information, or the monitored attribute.

Example 51 is the method of example 50 wherein the mitigation instruction is generated based on the questionnaire responses.

Example 52 is the method of either of examples 50 or 51, the method further including receiving the questionnaire responses to the safety questionnaire via a receiver.

Example 53 is the method of example 52, the method further including generating based on the questionnaire responses a stop instruction for the robot to stop operating or generate a modified instruction for the robot, wherein the modified instruction includes robot movements that take into account the questionnaire responses.

Example 54 is the method of any one of examples 50 to 53, wherein the safety questionnaire includes a teaching instruction that teaches the person about safety with respect to the planned operation of the robot.

Example 55 is an apparatus including a means for determining a monitored attribute of a person within an operating environment of a robot, wherein the monitored attribute is based on received sensor information about the person in the operating environment. The apparatus also includes a means for determining a risk score for the person based on the monitored attribute, wherein the risk score is defined by a collision probability that the person will cause an interference during a planned operation of the robot and a severity level associated with the interference. The apparatus also includes a means for generating a mitigating instruction for the robot if the risk score exceeds a threshold level.

Example 56 is the apparatus of example 55, wherein the robot is configured to coordinate work operations with the person in the operating environment.

Example 57 is the apparatus of either of examples 55 or 56, wherein determining the monitored attribute includes determining at least one of the following based on the received sensor information: equipment information about safety equipment worn by the person, an identification profile for the person, training information about a training level of the person with respect to the planned operation, a sound within the environment, a distraction level of the person, a response time of the person, or a monitored behavior of the person.

Example 58 is the apparatus of any one of examples 55 to 57, wherein determining the risk score is based on a behavior-matching score indicative of a difference between an expected behavior of the person and the monitored attribute.

Example 59 is the apparatus of example 58, wherein the apparatus includes a means for determining the expected behavior based on an estimated trajectory of the person and an associated confidence level of the estimated trajectory.

Example 60 is the apparatus of any one of examples 55 to 59, wherein determining the collision probability is based on at least one of a robot trajectory of the robot associated with the planned operation or an expected behavior of the person during the planned operation.

Example 61 is the apparatus of any one of examples 55 to 60, wherein the apparatus is incorporated into the robot.

Example 62 is the apparatus of any one of examples 55 to 61, further including a means for storing at least one of the monitored attribute, received sensor information, the risk score, the collision probability, the severity level, or the mitigating instruction.

Example 63 is the apparatus of any one of examples 55 to 62, wherein the apparatus is remote from the robot.

Example 64 is the apparatus of any one of examples 55 to 63, wherein the severity level is determined based on at least one of the following: equipment information about safety equipment worn by the person, training information about a training level of the person with respect to the planned operation, or robot movements of the robot associated with the planned operation of the robot.

Example 65 is the apparatus of example 64, wherein the severity level is determined from a severity lookup table that associates severity levels with at least one of the following: the equipment information, the training information, or the robot movements.

Example 66 is the apparatus of example 65, wherein the severity level is determined based on grouping the received sensor information into a plurality of behavior categories, wherein each behavior category of the plurality of behavior categories has an associated weighting, wherein the severity level includes a weighted sum of each behavior category multiplied by the associated weighting.

Example 67 is the apparatus of any one of examples 55 to 66, wherein the mitigating instruction includes at least one of the following: a stop instruction for the robot to stop operating; or a modified instruction associated with a modified instruction risk level that is lower than the risk level, wherein the apparatus further includes a means for determining the modified instruction risk level based on a collision probability of the modified instruction and a severity level of the modified instruction.

Example 68 is the apparatus of example 67, the apparatus further including a means for selecting the modified instruction from a plurality of possible modified instructions, wherein each possible modified instruction of the plurality of possible modified instructions is associated with a corresponding risk level of the possible modified instruction, wherein selecting the possible modified instruction is based on the corresponding risk level.

Example 69 is the apparatus of example 68, selecting the possible modified instruction is based on a progress level associated with the possible modified instruction, wherein the progress level is defined by progress toward completing the planned operation provided from the possible modified instruction.

Example 70 is the apparatus of any one of examples 67 to 69, wherein the modified instruction includes a reduced speed of robot movements associated with the planned operation.

Example 71 is the apparatus of any one of examples 55 to 70, wherein the apparatus further includes a means for receiving the received sensor information about the person.

Example 72 is the apparatus of any one of examples 55 to 71, wherein the apparatus includes a receiving means for receiving the received sensor information from a sensing means, wherein the sensing means includes at least one of a depth sensor, a camera, a radar, a light ranging and detection sensor, a microphone, a health-monitoring sensor, a heart-rate monitor, a motion sensor, a gyroscopic sensor, an accelerometer, and/or an ultrasonic senor.

Example 73 is the apparatus of any one of examples 55 to 72, wherein the risk score includes a plurality of risk scores, wherein the environment is subdivided into a plurality of subregions, wherein each risk score of the plurality of risk scores includes a regional risk score for a corresponding subregion of the plurality of subregions.

Example 74 is the apparatus of example 73, the apparatus further including a means for determining the regional risk score based on a corresponding collision probability for the corresponding subregion and a corresponding severity level for the corresponding subregion.

Example 75 is the apparatus of example 74, wherein the threshold level includes a plurality of subregion threshold levels, wherein each corresponding subregion of the plurality of subregions has an associated subregion threshold level from the plurality of subregion threshold levels, wherein the mitigating instruction is configured to avoid corresponding subregions where the regional risk score for the corresponding region exceeds the subregion threshold level for the corresponding region.

Example 76 is the apparatus of any one of examples 55 to 75, wherein the monitored attribute of the person includes at least one of the following: a facial expression of the person;

an emotional reaction of the person; a spoken word from the person; a movement of the person; a posture of the person; or a heart rate of the person.

Example 77 is the apparatus of any one of examples 57 to 76, wherein the equipment information about safety equipment worn by the person includes an indication of at least one of a clothing worn by the person, a personal protective equipment worn by the person, an emergency off button worn by the person, safety glasses worn by the person, a helmet worn by the person, a glove worn by the person, or an ear plug worn by the person.

Example 78 is the apparatus of any one of examples 57 to 77, the apparatus further including a means for generating a safety questionnaire for the person, wherein the safety questionnaire is based on at least one of the following: the risk score, the identification profile, the training information, or the monitored attribute.

Example 79 is the apparatus of example 78 wherein the mitigation instruction is generated based on the questionnaire responses.

Example 80 is the apparatus of either of examples 78 or 79, the apparatus further including a means for receiving the questionnaire responses to the safety questionnaire.

Example 81 is the apparatus of example 80, the apparatus further including a means for generating a stop instruction for the robot to stop operating or a means for generating a modified instruction for the robot, wherein the modified instruction includes robot movements that take into account the questionnaire responses.

Example 82 is the apparatus of any one of examples 78 to 81, wherein the safety questionnaire includes a teaching instruction that teaches the person about safety with respect to the planned operation of the robot.

Example 83 is a non-transitory computer readable medium, including instructions which, if executed, cause a processor to determine a monitored attribute of a person within an operating environment of a robot, wherein the monitored attribute is based on received sensor information about the person in the operating environment. The instructions also cause the processor to determine a risk score for the person based on the monitored attribute, wherein the risk score is defined by a collision probability that the person will cause an interference during a planned operation of the robot and a severity level associated with the interference. The instructions also cause the processor to generate a mitigating instruction for the robot if the risk score exceeds a threshold level.

Example 84 is the non-transitory computer readable medium of example 83, wherein the robot is configured to coordinate work operations with the person in the operating environment.

Example 85 is the non-transitory computer readable medium of either of examples 83 or 84, wherein the processor configured to determine the monitored attribute includes the processor configured to determine at least one of the following based on the received sensor information: equipment information about safety equipment worn by the person, an identification profile for the person, training information about a training level of the person with respect to the planned operation, a sound within the environment, a distraction level of the person, a response time of the person, or a monitored behavior of the person.

Example 86 is the non-transitory computer readable medium of any one of examples 83 to 85, wherein the instructions also cause the processor to determine the risk score based on a behavior-matching score indicative of a difference between an expected behavior of the person and the monitored attribute.

Example 87 is the non-transitory computer readable medium of example 86, wherein the instructions also cause the processor to determine the expected behavior based on an estimated trajectory of the person and an associated confidence level of the estimated trajectory.

Example 88 is the non-transitory computer readable medium of any one of examples 83 to 87, wherein the instructions also cause the processor to determine the collision probability based on at least one of a robot trajectory of the robot associated with the planned operation or an expected behavior of the person during the planned operation.

Example 89 is the non-transitory computer readable medium of any one of examples 83 to 88, wherein the non-transitory computer readable medium is incorporated into the robot.

Example 90 is the non-transitory computer readable medium of any one of examples 83 to 89, further including a memory configured to store at least one of the monitored attribute, received sensor information, the risk score, the collision probability, the severity level, or the mitigating instruction.

Example 91 is the non-transitory computer readable medium of any one of examples 83 to 90, wherein the non-transitory computer readable medium is remote from the robot.

Example 92 is the non-transitory computer readable medium of any one of examples 83 to 91, wherein the instructions also cause the processor to determine the severity level based on at least one of the following: equipment information about safety equipment worn by the person, training information about a training level of the person with respect to the planned operation, or robot movements of the robot associated with the planned operation of the robot.

Example 93 is the non-transitory computer readable medium of example 92, wherein the instructions also cause the processor to determine the severity level from a severity lookup table that associates severity levels with at least one of the following: the equipment information, the training information, or the robot movements.

Example 94 is the non-transitory computer readable medium of example 93, wherein the instructions cause the processor to determine the severity level based on grouping the received sensor information into a plurality of behavior categories, wherein each behavior category of the plurality of behavior categories has an associated weighting, wherein the severity level includes a weighted sum of each behavior category multiplied by the associated weighting.

Example 95 is the non-transitory computer readable medium of any one of examples 83 to 94, wherein the mitigating instruction includes at least one of the following: a stop instruction for the robot to stop operating; or a modified instruction associated with a modified instruction risk level that is lower than the risk level, wherein the instructions cause the processor to determine the modified instruction risk level based on a collision probability of the modified instruction and a severity level of the modified instruction.

Example 96 is the non-transitory computer readable medium of example 95, wherein the instructions cause the processor to select the modified instruction from a plurality of possible modified instructions, wherein each possible modified instruction of the plurality of possible modified instructions is associated with a corresponding risk level of the possible modified instruction, wherein the instructions cause the processor to select the possible modified instruction based on the corresponding risk level.

Example 97 is the non-transitory computer readable medium of example 96, wherein the instructions also cause the processor to select the possible modified instruction based on a progress level associated with the possible modified instruction, wherein the progress level is defined by progress toward completing the planned operation provided from the possible modified instruction.

Example 98 is the non-transitory computer readable medium of any one of examples 95 to 97, wherein the modified instruction includes a reduced speed of robot movements associated with the planned operation.

Example 99 is the non-transitory computer readable medium of any one of examples 83 to 98, further including a sensor configured to provide the received sensor information about the person.

Example 100 is the non-transitory computer readable medium of any one of examples 83 to 99, wherein the instructions cause the processor to receive the received sensor information from a sensor including a depth sensor, a camera, a radar, a light ranging and detection sensor, a microphone, a health-monitoring sensor, a heart-rate monitor, a motion sensor, a gyroscopic sensor, an accelerometer, and/or an ultrasonic senor.

Example 101 is the non-transitory computer readable medium of any one of examples 83 to 100, wherein the risk score includes a plurality of risk scores, wherein the environment is subdivided into a plurality of subregions, wherein each risk score of the plurality of risk scores includes a regional risk score for a corresponding subregion of the plurality of subregions.

Example 102 is the non-transitory computer readable medium of example 101, wherein the instructions cause the processor to determine the regional risk score based on a corresponding collision probability for the corresponding subregion and a corresponding severity level for the corresponding subregion.

Example 103 is the non-transitory computer readable medium of example 102, wherein the threshold level includes a plurality of subregion threshold levels, wherein each corresponding subregion of the plurality of subregions has an associated subregion threshold level from the plurality of subregion threshold levels, wherein the mitigating instruction is configured to avoid corresponding subregions where the regional risk score for the corresponding region exceeds the subregion threshold level for the corresponding region.

Example 104 is the non-transitory computer readable medium of any one of examples 83 to 103, wherein the monitored attribute of the person includes at least one of the following: a facial expression of the person; an emotional reaction of the person; a spoken word from the person; a movement of the person; a posture of the person; or a heart rate of the person.

Example 105 is the non-transitory computer readable medium of any one of examples 85 to 104, wherein the equipment information about safety equipment worn by the person includes an indication of at least one of a clothing worn by the person, a personal protective equipment worn by the person, an emergency off button worn by the person, safety glasses worn by the person, a helmet worn by the person, a glove worn by the person, or an ear plug worn by the person.

Example 106 is the non-transitory computer readable medium of any one of examples 85 to 105, wherein the instructions also cause the processor to generate a safety questionnaire for the person, wherein the safety questionnaire is based on at least one of the following: the risk score, the identification profile, the training information, or the monitored attribute.

Example 107 is the non-transitory computer readable medium of example 106 wherein the instructions cause the processor to generate the mitigation instruction based on the questionnaire responses.

Example 108 is the non-transitory computer readable medium of either of examples 106 or 107, further including a receiver is configured to receive the questionnaire responses to the safety questionnaire.

Example 109 is the non-transitory computer readable medium of example 108, wherein the instructions also cause the processor to, based on the questionnaire responses, generate a stop instruction for the robot to stop operating or generate a modified instruction for the robot, wherein the modified instruction includes robot movements that take into account the questionnaire responses.

Example 110 is the non-transitory computer readable medium of any one of examples 106 to 109, wherein the safety questionnaire includes a teaching instruction that teaches the person about safety with respect to the planned operation of the robot.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A device comprising:
a processor configured to:
determine a monitored attribute of a person within an operating environment of a robot, wherein the monitored attribute is based on received sensor information about the person in the operating environment;
determine a risk score for the person based on the monitored attribute, wherein the risk score is defined by
a collision probability that the person will cause an interference during a planned operation of the robot;
a severity level associated with the interference; and
control, based on whether the risk score exceeds a threshold level, the robot to stop operating or to operate according to a modified instruction, wherein the modified instruction comprises a change to the planned operation of the robot and is associated with a modified instruction risk level that is lower than the risk score;
select the modified instruction from among a plurality of possible modified instructions, wherein each possible modified instruction of the plurality of possible modified instructions is associated with a corresponding risk level of the each possible modified instruction, wherein the modified instruction is selected based on the corresponding risk level; and
determine, for each possible modified instruction of the plurality of possible modified instructions, the corresponding risk level based on a corresponding collision probability and a corresponding severity level of the possible modified instruction.

2. The device of claim 1, wherein the processor configured to determine the monitored attribute comprises the processor configured to determine at least one of the following based on the received sensor information: equipment information about safety equipment worn by the person; an identification profile for the person; training information about a training level of the person with respect to the planned operation; a sound within the operating environment; a distraction level of the person; a response time of the person; and a monitored behavior of the person.

3. The device of claim 1, wherein the processor is configured to determine the risk score based on a behavior-matching score indicative of a difference between an expected behavior of the person and the monitored attribute.

4. The device of claim 3, wherein the processor is configured to determine the expected behavior based on an estimated trajectory of the person and an associated confidence level of the estimated trajectory.

5. The device of claim 1, wherein the processor is configured to determine the collision probability based on at least one of a robot trajectory of the robot associated with the planned operation or an expected behavior of the person during the planned operation.

6. The device of claim 1, further comprising a memory configured to store at least one of the monitored attribute, received sensor information, the risk score, the collision probability, the severity level, or the modified instruction.

7. The device of claim 1, wherein the processor is configured to determine the severity level based on at least one of the following: equipment information about safety equipment worn by the person; training information about a training level of the person with respect to the planned operation; and robot movements of the robot associated with the planned operation of the robot.

8. The device of claim 7, wherein the processor is configured to determine the severity level from a severity lookup table that associates severity levels with at least one of the following: the equipment information; the training information; and the robot movements.

9. The device of claim 1, wherein the processor is further configured to select the possible-modified instruction based on a progress level associated with the each possible modified instruction, wherein the progress level is defined by progress toward completing the planned operation provided from the each possible modified instruction.

10. The device of claim 1, the device further comprising a receiver configured to receive the received sensor information from a sensor, wherein the sensor comprises a depth sensor, a camera, a radar, a light ranging and detection sensor, a microphone, a health-monitoring sensor, a heart-rate monitor, a motion sensor, a gyroscopic sensor, an accelerometer, and/or an ultrasonic sensor.

11. The device of claim 1, wherein the risk score comprises a plurality of risk scores, wherein the operating environment is subdivided into a plurality of subregions, wherein each risk score of the plurality of risk scores comprises a regional risk score for a corresponding subregion of the plurality of subregions, wherein the processor is configured to determine the regional risk score based on a corresponding collision probability for the corresponding subregion and a corresponding severity level for the corresponding subregion.

12. The device of claim 11, wherein the threshold level comprises a plurality of subregion threshold levels, wherein each corresponding subregion of the plurality of subregions has an associated subregion threshold level from the plurality of subregion threshold levels, wherein the modified instruction is configured to avoid corresponding subregions where the regional risk score for the each corresponding region exceeds the subregion threshold level for the corresponding region.

13. A non-transitory computer readable medium, including instructions which, if executed, cause a processor to:
determine a monitored attribute of a person within an operating environment of a robot, wherein the monitored attribute is based on received sensor information about the person in the operating environment;
determine a risk score for the person based on the monitored attribute, wherein the risk score is defined by a collision probability that the person will cause an interference during a planned operation of the robot; and
a severity level associated with the interference; and
control, based on whether the risk score exceeds a threshold level, the robot to stop operating or to operate according to a modified instruction, wherein the modified instruction comprises a change to the planned operation of the robot and is associated with a modified instruction risk level that is lower than the risk score;
select the modified instruction from among a plurality of possible modified instructions, wherein each possible modified instruction of the plurality of possible modified instructions is associated with a corresponding risk level of the each possible modified instruction, wherein the modified instruction is selected based on the corresponding risk level; and
determine, for each possible modified instruction of the plurality of possible modified instructions, the corresponding risk level based on a corresponding collision probability and a corresponding severity level of the possible modified instruction.

14. The non-transitory computer readable medium of claim 13, wherein the monitored attribute of the person comprises at least one of the following: a facial expression of the person; an emotional reaction of the person; a spoken word from the person; a movement of the person; a posture of the person; equipment information about safety equipment worn by the person; an identification profile for the person; training information about a training level of the person with respect to the planned operation; a sound within the operating environment; a distraction level of the person; a response time of the person; a monitored behavior of the person; and a heart rate of the person.

15. The non-transitory computer readable medium of claim 14, wherein the equipment information about safety equipment worn by the person comprises an indication of at least one of a clothing worn by the person, a personal protective equipment worn by the person, an emergency off button worn by the person, safety glasses worn by the person, a helmet worn by the person, a glove worn by the person, or an ear plug worn by the person.

16. The non-transitory computer readable medium of claim 14, wherein the instructions also cause the processor to generate a safety questionnaire for the person, wherein the safety questionnaire is based on at least one of the following: the risk score the identification profile; the training information; and the monitored attribute.

17. The non-transitory computer readable medium of claim 16, wherein the instructions also cause the processor to receive questionnaire responses to the safety questionnaire, wherein the processor is configured to generate the mitigation modified instruction based on the questionnaire responses.

18. The non-transitory computer readable medium of claim 16, wherein the safety questionnaire comprises a teaching instruction that teaches the person about safety with respect to the planned operation of the robot.

* * * * *

UNITED STATES PATENT AND TRADEMARK OFFICE
CERTIFICATE OF CORRECTION

| | | |
|---|---|---|
| PATENT NO. | : 12,420,422 B2 | Page 1 of 1 |
| APPLICATION NO. | : 17/553854 | |
| DATED | : September 23, 2025 | |
| INVENTOR(S) | : Oboril et al. | |

It is certified that error appears in the above-identified patent and that said Letters Patent is hereby corrected as shown below:

In the Claims

Claim 17, Column 32, Line 64: delete "mitigation"

Signed and Sealed this
Eighteenth Day of November, 2025

John A. Squires
*Director of the United States Patent and Trademark Office*